(12) United States Patent
Baumann et al.

(10) Patent No.: US 11,052,375 B2
(45) Date of Patent: Jul. 6, 2021

(54) ADSORPTION COOLING SYSTEM USING CARBON AEROGEL

(75) Inventors: Theodore F. Baumann, Discover Bay, CA (US); Joe H. Satcher, Jr., Patterson, CA (US); Joseph C. Farmer, Tracy, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 2491 days.

(21) Appl. No.: 13/457,338

(22) Filed: Apr. 26, 2012

(65) Prior Publication Data
US 2013/0283845 A1 Oct. 31, 2013

(51) Int. Cl.
  *F25B 17/00* (2006.01)
  *B23P 15/26* (2006.01)
  (Continued)

(52) U.S. Cl.
  CPC .............. *B01J 20/20* (2013.01); *B01J 20/06* (2013.01); *B01J 20/103* (2013.01);
  (Continued)

(58) Field of Classification Search
  CPC .............. B01J 2231/763; B01J 31/1691; B01J 20/226; F25B 27/007; F25B 17/00;
  (Continued)

(56) References Cited

U.S. PATENT DOCUMENTS 3,169,927 A    2/1965  Matsch
5,157,010 A *  10/1992 Maus ....................... B01J 35/04
                                                              428/593
(Continued)

FOREIGN PATENT DOCUMENTS

WO         00/29796 A1    5/2000
WO         02/45847 A2    6/2002
WO       2008/155543 A2  12/2008

OTHER PUBLICATIONS

U.S. Appl. No. 12/848,564, filed Aug. 2, 2010.
(Continued)

*Primary Examiner* — Jianying C Atkisson
*Assistant Examiner* — Meraj A Shaikh
(74) *Attorney, Agent, or Firm* — Zilka-Kotab, P.C.

(57) ABSTRACT

An adsorptive cooling system includes: a first highly adsorptive structure positioned to receive thermal energy from a thermal energy source, the first highly adsorptive structure including: a first substrate; and a first carbon aerogel adhered to the first substrate, a second highly adsorptive structure positioned to receive thermal energy from the thermal energy source, the second highly adsorptive structure including: a second substrate; and a second carbon aerogel adhered to the second substrate, a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure.

27 Claims, 18 Drawing Sheets

(51) Int. Cl.

| | |
|---|---|
| B01J 20/20 | (2006.01) |
| B01J 20/28 | (2006.01) |
| B01J 20/06 | (2006.01) |
| B01J 20/10 | (2006.01) |
| C09K 5/04 | (2006.01) |
| B01J 20/30 | (2006.01) |
| F25B 17/08 | (2006.01) |
| F25B 27/00 | (2006.01) |

(52) U.S. Cl.
CPC ..... *B01J 20/2804* (2013.01); *B01J 20/28042* (2013.01); *B01J 20/28047* (2013.01); *B01J 20/28052* (2013.01); *B01J 20/28066* (2013.01); *B01J 20/3085* (2013.01); *C09K 5/047* (2013.01); *F25B 17/083* (2013.01); *F25B 27/007* (2013.01)

(58) Field of Classification Search
CPC ......... F25B 17/08; Y02B 10/20; Y02B 10/24; B23P 15/26
USPC .... 62/476, 477, 56, 101, 238.1; 29/890.035; 502/401; 126/687
See application file for complete search history.

(56) References Cited

U.S. PATENT DOCUMENTS

| | | | |
|---|---|---|---|
| 6,122,920 A | 9/2000 | Hill et al. | |
| 6,491,740 B1* | 12/2002 | Wang | B01D 53/02 502/400 |
| 6,946,164 B2 | 9/2005 | Huang | |
| 7,520,371 B2 | 4/2009 | Lockledge et al. | |
| 8,425,674 B2* | 4/2013 | Minhas | B01J 20/3204 62/480 |
| 8,613,204 B2* | 12/2013 | Farmer | F25B 27/007 126/705 |
| 11,000,823 B2 | 5/2021 | Baumann et al. | |
| 2004/0265393 A1* | 12/2004 | Unger | A61B 17/22004 424/600 |
| 2007/0163663 A1* | 7/2007 | Strand | B01L 3/502738 137/827 |
| 2008/0161631 A1 | 7/2008 | Axtell et al. | |
| 2009/0082479 A1 | 3/2009 | Cho | |
| 2009/0117268 A1 | 5/2009 | Lewis et al. | |
| 2010/0132359 A1 | 6/2010 | Minhas et al. | |
| 2010/0230298 A1 | 9/2010 | Biener et al. | |
| 2011/0067426 A1* | 3/2011 | Hwang | F24F 3/1411 62/271 |
| 2011/0100036 A1* | 5/2011 | Farmer | F25B 27/007 62/101 |
| 2011/0143202 A1* | 6/2011 | Farmer | H01M 4/0416 429/218.1 |
| 2011/0224376 A1* | 9/2011 | Zhai | B01J 13/0091 525/186 |
| 2012/0028798 A1* | 2/2012 | Worsley | B01J 21/18 502/439 |
| 2012/0034442 A1* | 2/2012 | Pauzauskie | B82Y 30/00 428/219 |
| 2013/0283847 A1 | 10/2013 | Baumann et al. | |

OTHER PUBLICATIONS

Kabbour et al., "Toward New Candidates for Hydrogen Storage: High-Surface-Area Carbon Aerogels," Chemistry of Materials, vol. 18, No. 26, Dec. 26, 2006, pp. 6085-6087.
Baumann et al., "High surface area carbon aerogel monoliths with hierarchical porosity," Journal of Non-Crystalline Solids, vol. 354, 2008, pp. 3513-3515.
August et al., "An Adaptive UWB Modulation Scheme for Optimization of Energy, BER, and Data Rate," 2004 IEEE, pp. 182-186.
Yi et al., "Ultra Wideband Technology for Micro Air Vehicles Data Link Systems," 2008 IEEE, ICMMT2008 Proceedings, pp. 1-4.
Muto et al., "A Study on Co-Channel Interference Reduction Manipulating PRF in Asynchronous UWB-MBOK Systems," 2004 IEEE, pp. 332-335.
Padgett, J. E., "The Power Spectral Density of a UWB Signal With Pulse Repetition Frequency (PRF) Modulation," 2003 IEEE, pp. 15-20.
Baughman et al., "Carbon Nanotube Actuators," Science, vol. 284, May 21, 1999, p. 1340-1344.
Baumann et al., U.S. Appl. No. 13/843,818, filed Mar. 15, 2013.
Critoph, R. E., "Forced convection adsorption cycle with packed bed heat regeneration," International Journal of Refrigeration, vol. 22, Issue 1, Jan. 1999, pp. 38-46.
Critoph, R. E., "Forced convection adsorption cycles," Applied Thermal Engineering, vol. 18, Issues 9-10, Sep. 1998, pp. 799-807.
Critoph, R. E., "Performance Limitations of adsorption cycles for solar cooling," Solar Energy, vol. 41, Issue1, 1988, pp. 21-31.
Kongtip et al., "Development of a Sampling and Analysis Method for 4-Vinyl-1-Cyclohexene in Air" Journal of Occupational Health, vol. 50, No. 2, pp. 122-129.
Li et al., "Influence of mass recovery on the performance of a heat pipe type ammonia sorption refrigeration system using CaCl2/activated carbon as compound adsorbent" Applied Thermal Engineering vol. 28, Issue 13, Sep. 2008, pp. 1638-1646.
Li et al., "Performance analysis of an innovative multimode, multisalt and multieffect chemisorption refrigeration system" Aiche Journal 53, 2007, pp. 3222-3230.
Li et al., "Thermodynamic study of a combined double-way solid-gas thermochemical sorption refrigeration cycle" International Journal of Refrigeration, vol. 32, 2009, pp. 1570-1578.
Libardoni et al., "Analysis of human breath samples with a multibed sorption trap and comprehensive two-dimensional gas chromatography (GCxGC)" Journal of Chromatography B, vol. 842, Issue 1, Sep. 14, 2006, pp. 13-21.
Lu et al., "Performance analysis of an adsorption refrigerator using activated carbon in a compound adsorbent," Carbon, vol. 44, 2006, pp. 747-752.
Luo et al., "Thermodynamics of Adsorption Cycles: A Theoretical Study," Heat Transfer Engineering, vol. 13, Issue 4, 1992, pp. 19-31.
Meunier, F., "Solid sorption heat powered cycles for cooling and heat pumping applications," Applied Thermal Engineering, vol. 18, Issues 9-10, Sep. 1998, pp. 715-729.
Norikyo et al., "Application of the circulating moving bed process for CO2 recovery from the flue gas of coal-thermal power plants," Kagaku Kogaku Ronbunshu, vol. 5, No. 5, 2002, pp. 636-640.
Pons et al., "Adsorptive machines with advanced cycles for heat pumping or cooling applications: Cycles á adsorption pour pompes á chaleur ou machines frigor: figues," International Journal of Refrigeration, vol. 22, Issue 1, Jan. 1999, pp. 27-37.
Tassou et al., "A review of emerging technologies for food refrigeration applications" Applied Thermal Engineering, vol. 30, Issue 4, Mar. 2010, pp. 263-276.
Teng et al., "Study of the fundamentals of adsorption systems," Applied Thermal Engineering, vol. 17, Issue 4, Apr. 1997, pp. 327-338.
Vasiliev et al., "Solar-gas solid sorption refrigerator," Adsorption, vol. 7, Issue 2, Sep. 2001, pp. 149-161.
Vasiliev, "Solar sorption refrigerators with dual sources of energy," Proceedings of the International Sorption Heat Pump Conference, 2002, pp. 26-33.
Wang et al., "Impact of refrigerant flowing resistance on active carbon-ammonia adsorption refrigeration cycle," Applied Thermal Engineering vol. 25, 2005, pp. 451-460.
Wang et al., "Research on the chemical adsorption precursor state of CaCl2—NH3 for adsorption refrigeration," Science in China Ser. E Engineering and Materials Science, vol. 48, No. 1, pp. 70-82.
Wang et al., "Design of a novel adsorption refrigeration truck air conditioner driven by exhaust gas," Proceedings of the World Engineers' Convention 2004, vol. F-A, Resources and Energy, 2004, pp. 519-523 (Abstract Only).
Restriction Requirement from U.S. Appl. No. 13/843,818, dated Mar. 17, 2016.

(56) References Cited

OTHER PUBLICATIONS

Vasiliev, L., "Solar sorption refrigerators with dual sources of energy," Powerpoint Presentation of the International Sorption Heat Pump Conference, 2002, 16 pages.
Non-Final Office Action from U.S. Appl. No. 13/843,818, dated Sep. 16, 2016.
Non-Final Office Action from U.S. Appl. No. 13/843,818, dated Apr. 12, 2017.
Final Office Action from U.S. Appl. No. 13/843,818, dated Dec. 29, 2017.
Final Office Action from U.S. Appl. No. 13/843,818, dated Oct. 25, 2018.
Examiner's Answer to Appeal Brief from U.S. Appl. No. 13/843,818, dated Sep. 9, 2019.
Patent Board Decision on Appeal from U.S. Appl. No. 13/843,818, dated Dec. 2, 2020.
Notice of Allowance from U.S. Appl. No. 13/843,818, dated Feb. 17, 2021.
Corrected Notice of Allowance from U.S. Appl. No. 13/843,818, dated Apr. 9, 2021.

\* cited by examiner

ADSORPTION COOLING SYSTEM USING CARBON AEROGEL

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present disclosure relates to carbon aerogels, and particularly, to high-surface area carbon aerogels as adsorbents for adsorptive cooling systems and methods of use thereof.

BACKGROUND

A significant amount of expensive electrical energy is used to air condition and refrigerate commercial and industrial facilities and processes. For example, air conditioning and low temperature refrigeration constitute 19% and 9%, respectively, of all electrical energy consumed by commercial buildings. If concentrating solar energy or other waste heat was recaptured or collocated with end use, it could power thermally activated cooling systems and substantially reduce electrical power consumption.

While adsorption-based cooling and refrigeration systems are simple and easy to maintain, today's systems are expensive and relatively inefficient, requiring large footprints and high desorption temperatures. Therefore, it would be beneficial to reduce costs associated with developing, manufacturing, and using highly adsorptive nanoporous materials for adsorptive cooling applications by using carbon aerogel and substrate combination which improves the adsorption/desorption performance of the structures produced, and enhances the mass-specific stored energy density by using lightweight materials.

Carbon based materials have been used in some applications, as disclosed in R. H. Baughman et al., *Science* 284, 1340 (1999), where carbon nanotubes were used for actuation. Although this is a light-weight material, it is only available in rope or sheet geometries and not as three dimensional bodies capable of shaping, forming, and molding to application specific dimensions, which prevents loading in compression. Furthermore, these materials at present are prohibitively costly. Therefore, they do not currently present a viable solution to the above described problems.

SUMMARY

In one embodiment, a product includes a highly adsorptive structure including: a substrate; and a carbon aerogel adhered to the substrate, where the carbon aerogel is characterized by having physical characteristics of in-situ formation on the substrate In another embodiment, an adsorptive cooling system includes a first highly adsorptive structure positioned to receive thermal energy from a thermal energy source, the first highly adsorptive structure including: a first substrate; and a first carbon aerogel adhered to the first substrate, a second highly adsorptive structure positioned to receive thermal energy from the thermal energy source, the second highly adsorptive structure including: a second substrate; and a second carbon aerogel adhered to the second substrate, a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, wherein the first carbon aerogel is characterized by having physical characteristics of in-situ formation on the first substrate, and wherein the second carbon aerogel is characterized by having physical characteristics of in-situ formation on the second substrate, and wherein the first and/or second substrate comprises a plurality of microchannels, wherein each of the first carbon aerogel and the second carbon aerogel are adhered to an interior and/or exterior surface of the plurality of microchannels, wherein the microchannels are defined by at least one of grooves in a surface of the substrate nearest the carbon aerogel and surfaces of a plurality of microcapillaries of the substrate, wherein the microchannels provide ingress and egress paths for a refrigerant.

In still another embodiment, an adsorptive cooling system includes a first highly adsorptive structure positioned to receive thermal energy from a thermal energy source, the first highly adsorptive structure including: a first substrate; and a first carbon aerogel adhered to the first substrate, the first carbon aerogel comprising a monolithic structure having a surface facing the first substrate that is substantially conformal to the surface of the substrate adjacent thereto, a second highly adsorptive structure positioned to receive thermal energy from the thermal energy source, the second highly adsorptive structure including: a second substrate; and a second carbon aerogel adhered to the second substrate, the second carbon aerogel comprising a monolithic structure having a surface facing the second substrate that is substantially conformal to the surface of the substrate adjacent thereto a cooling unit; and a circulation system adapted for: circulating a refrigerant from at least one of the first highly adsorptive structure and the second highly adsorptive structure to the cooling unit to provide cooling from the thermal energy source; and returning the refrigerant from the cooling unit to at least one of the first highly adsorptive structure and the second highly adsorptive structure; wherein the first carbon aerogel and the second carbon aerogel are each characterized by a surface area of greater than 3000 $m^2/g$, wherein the adsorptive cooling system is characterized by a 7 kilowatt (kW) cooling capacity, wherein the adsorptive cooling system is characterized by an electrical to cooling energy coefficient of performance (COP) greater than 3.8, wherein the refrigerant desorbs from each of the first carbon aerogel and the second carbon aerogel at a temperature of less than 90° C., wherein the second substrate comprises a second plurality of microchannels adapted for conducting thermal energy through an interior volume of the second plurality of microchannels and along the exterior surface of the second plurality of microchannels, wherein the second carbon aerogel is characterized by having physical characteristics of in-situ formation on the second substrate, the physical characteristics of in-situ formation including: the second carbon aerogel being adhered to each of an interior surface of the second plurality of microchannels and an exterior surface of the second plurality of microchannels; and a volumetric reduction of the second carbon aerogel, wherein the second substrate comprises a second plurality of microchannels adapted for conducting thermal energy through an interior volume of the second plurality of microchannels and along the exterior surface of the second plurality of microchannels, wherein the second carbon aerogel is characterized by having physical characteristics of in-situ formation on the second substrate, the physical characteristics of in-situ formation comprising: the second carbon aerogel being adhered to each of an interior surface of the second plurality of microchannels and an exterior surface of the second plurality of microchannels; and a volumetric reduction of the second carbon aerogel, wherein the in situ formation on the first substrate and the in situ formation on the second substrate each comprise a casting process.

Other aspects and embodiments of the present disclosure will become apparent from the following detailed description, which, when taken in conjunction with the drawings, illustrate by way of example the principles of the invention.

DETAILED DESCRIPTION

Figure 1:
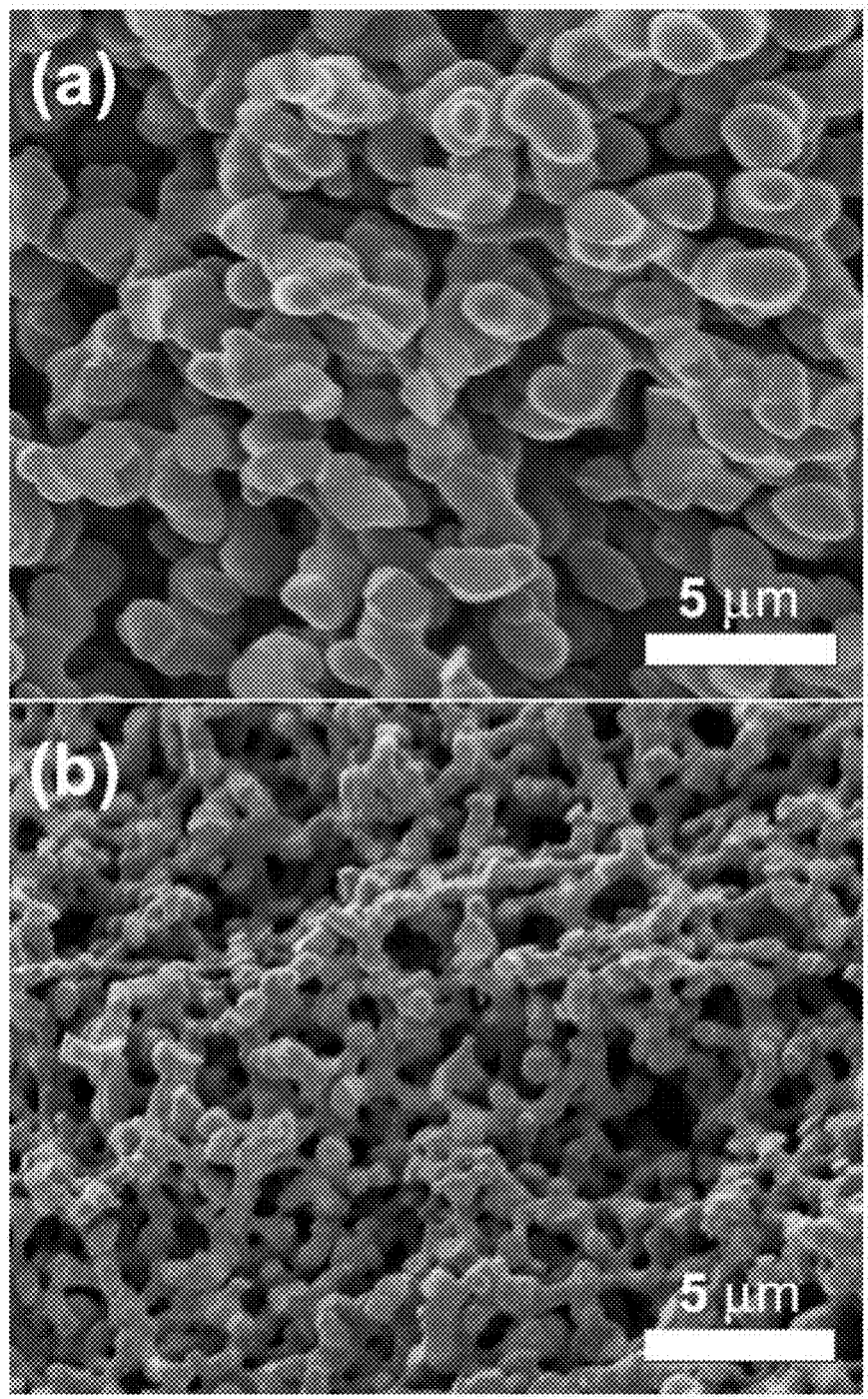
FIG. 1 includes two SEM micrographs, a) a pre-activated CA, and b) an activated CA with a surface area of 3200 $m^2/g$.

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

In one general embodiment, a product includes a highly adsorptive structure including: a substrate; and a carbon aerogel adhered to the substrate, where the carbon aerogel is characterized by having physical characteristics of in-situ formation on the substrate In another general embodiment, an adsorptive cooling system includes a first highly adsorptive structure positioned to receive thermal energy from a thermal energy source, the first highly adsorptive structure including: a first substrate; and a first carbon aerogel adhered to the first substrate, a second highly adsorptive structure positioned to receive thermal energy from the thermal energy source, the second highly adsorptive structure including: a second substrate; and a second carbon aerogel adhered to the second substrate, a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, wherein the first carbon aerogel is characterized by having physical characteristics of in-situ formation on the first substrate, and wherein the second carbon aerogel is characterized by having physical characteristics of in-situ formation on the second substrate, and wherein the first and/or second substrate comprises a plurality of microchannels, wherein each of the first carbon aerogel and the second carbon aerogel are adhered to an interior and/or exterior surface of the plurality of microchannels, wherein the microchannels are defined by at least one of grooves in a surface of the substrate nearest the carbon aerogel and surfaces of a plurality of microcapillaries of the substrate, wherein the microchannels provide ingress and egress paths for a refrigerant.

In still another general embodiment, an adsorptive cooling system includes a first highly adsorptive structure positioned to receive thermal energy from a thermal energy source, the first highly adsorptive structure including: a first substrate; and a first carbon aerogel adhered to the first substrate, the first carbon aerogel comprising a monolithic structure having a surface facing the first substrate that is substantially conformal to the surface of the substrate adjacent thereto, a second highly adsorptive structure positioned to receive thermal energy from the thermal energy source, the second highly adsorptive structure including: a second substrate; and a second carbon aerogel adhered to the second substrate, the second carbon aerogel comprising a monolithic structure having a surface facing the second substrate that is substantially conformal to the surface of the substrate adjacent thereto a cooling unit; and a circulation system adapted for: circulating a refrigerant from at least one of the first highly adsorptive structure and the second highly adsorptive structure to the cooling unit to provide cooling from the thermal energy source; and returning the refrigerant from the cooling unit to at least one of the fast highly adsorptive structure and the second highly adsorptive structure; wherein the first carbon aerogel and the second carbon aerogel are each characterized by a surface area of greater than 3000 $m^2/g$, wherein the adsorptive cooling system is characterized by a 7 kilowatt (kW) cooling capacity, wherein the adsorptive cooling system is characterized by an electrical to cooling energy coefficient of performance (COP) greater than 3.8, wherein the refrigerant desorbs from each of the first carbon aerogel and the second carbon aerogel at a temperature of less than 90° C., wherein the second substrate comprises a second plurality of microchannels adapted for conducting thermal energy through an interior volume of the second plurality of microchannels and along the exterior surface of the second plurality of microchannels, wherein the second carbon aerogel is characterized by having physical characteristics of in-situ formation on the second substrate, the physical characteristics of in-situ formation including: the second carbon aerogel being adhered to each of an interior surface of the second plurality of microchannels and an exterior surface of the second plurality of microchannels; and a volumetric reduction of the second carbon aerogel, wherein the second substrate comprises a second plurality of microchannels adapted for conducting thermal energy through an interior volume of the second plurality of microchannels and along the exterior surface of the second plurality of microchannels, wherein the second carbon aerogel is characterized by having physical characteristics of in-situ formation on the second substrate, the physical characteristics of in-situ formation comprising: the second carbon aerogel being adhered to each of an interior surface of the second plurality of microchannels and an exterior surface of the second plurality of microchannels; and a volumetric reduction of the second carbon aerogel, wherein the in situ formation on the first substrate and the in situ formation on the second substrate each comprise a casting process.

A list of acronyms used in the description is provided below.

AC activated carbon
ADRS solar powered adsorption-desorption refrigeration system
BET Brunauer-Emmett-Teller theory
CA carbon aerogel
CFC chlorofluorocarbon
CMMD Condensed Matter and Materials Division (LLNL)
CRADA cooperative research and development agreement
DHS Department of Homeland Security
EDAX energy-dispersive analysis of x rays
EER energy efficiency ratio
ESEM emission scanning electron microscopy
HVAC heating, ventilation, and air conditioning
LLNL Lawrence Livermore National Laboratory
NREL National Renewable Energy Laboratory
SEER seasonal energy efficiency ratio
T&P temperature and pressure
TEM transmission electron microscopy
UHS ultrahigh surface (carbon aerogel)

As used in this application, the term "Retractable Shade" means any light blocking system adapted to selectively block energy from the sun. For example, the "retractable shade" can alternatively be a lowered shade, a shutter shade, an electronic light blocking system for blocking energy from the sun, or any other system for blocking energy from the sun.

Highly Adsorptive Carbon Aerogel Materials and Methods of Fabrication

As presented herein, one approach includes designing high surface area carbons. The synthetic strategy involves the thermal activation of a CA material with structural features (particles and pores) on the micrometer scale. This approach not only provides access to high surface areas in CA materials, but also affords monolithic materials with bimodal porosity (macro- and micropores). Hierarchically porous carbons of this type present a number of advantages over unimodal carbon structures in terms of diffusion efficiency and surface area, and thus these materials should also have utility as new catalyst supports or electrodes for electrochemical devices.

Thermal activation of CAs involves the controlled burn-off of carbon from the network structure in an oxidizing atmosphere, such as carbon dioxide, resulting in the creation of new micropores as well as opening of closed porosity in the CA framework. Therefore, access to high surface areas in activated CAs requires careful design of the pre-activated carbon framework, as the morphology of the particles that comprise the network structure will ultimately determine the textural properties of the activated material. The microstructure of traditional CAs, consisting of nanometer-sized carbon particles and tortuous pore structures, can both limit the surface areas attainable through activation and lead to inhomogeneous burn-off in monolithic samples.

By utilizing CAs with larger pore and particle sizes, however, these issues can be mitigated and monolithic carbons with high surface areas and bimodal pore structures can be readily attained. The synthesis of pre-activated CA structures with larger features can be performed in a number of ways. For example, in some approaches carbon aerogels are typically prepared through sol-gel polymerization of resorcinol with formaldehyde in aqueous solution to produce organic gels that are then supercritically dried and subsequently pyrolyzed in an inert atmosphere. In one embodiment, the amount and type of catalyst used in the polymerization reaction may dictate the size, shape and/or connectivity of the primary network particles and, therefore, may be used to influence the structural properties of the resultant CA.

In one illustrative approach, a method to generate CAs with larger structural features employs low catalyst concentrations in a polymerization reaction. Alternatively, the use of acid catalysts in the sol-gel reaction has also been shown to generate porous structures with network and pore features on the micrometer scale. For the preparation of the CAs used in this study, acetic acid was selected as the reaction catalyst since the process not only affords macroporous carbon structures, but the monolithic products exhibit enhanced mechanical integrity relative to traditional CAs.

For the synthesis of the pre-activated CA, resorcinol (12.3 g, 0.112 mol) and 37% formaldehyde solution (17.9 g, 0.224 mol) may be dissolved in water (15 ml), followed by the addition of glacial acetic acid (0.44 g, 0.007 mol). The reaction mixture may then be transferred to glass molds and cured at 80° C. for 72 hours. The resultant organic hydrogels may be washed with acetone to remove the water and then dried with supercritical $CO_2$. In some approaches, the organic aerogels may subsequently be carbonized at 1050° C. for 3 hours under an $N_2$ atmosphere, yielding CA monoliths with densities 0.55 $g/cm^3$, as would be understood by one having ordinary skill in the art upon reading the present descriptions. Moreover, the activation of these materials in some embodiments may be carried out under flowing $CO_2$ (e.g. at a rate of 10 sccm and a temperature of 950° C.). As understood herein, activated CAs are designated as ACA-x, where x is the activation time in hours.

Moreover still, microstructural characterization may be performed using scanning electron microscopy (JEOL7401-F). Textural properties may be determined using $N_2$ adsorption-desorption techniques (ASAP 2010 Surface Area Analyzer, Micromeritics). Surface areas and pore volumes may be determined using Brunauer-Emmett-Teller (BET) and Barrett-Joyner-Halenda (BJH) methods, respectively, while micropore volumes may be calculated from t-plot analysis.

The morphology of the pre-activated CA may be evaluated using scanning electron microscopy (SEM). As shown in FIG. 5a, the skeletal structure of the pre-activated CA consists of interconnected micron-sized carbon ligaments that define a continuous macroporous network, in one approach. In more approaches, these ligaments appear to be made up of spherical primary particles that have fused together during network formation. This structural motif is similar to those in previous reports that used acetic acid as the reaction catalyst and is likely responsible for the enhanced mechanical integrity of these CA monoliths, according to one embodiment and as would be understood by one having ordinary skill in the art upon reading the present descriptions.

To determine the effect of activation on one embodiment of the textural properties of this CA structure, cylindrical monoliths of the material may be exposed to a stream of $CO_2$ at 950° C. for different soak times. Examination of the activated structures by SEM showed smaller network ligaments relative to the unactivated material.

There are many possible adsorption isotherm models that may be used to predict the coverage of high surface area materials by and adsorbing molecule from either gas or liquid phases. One of the most widely used and best known is the Langmuir isotherm, that will be used as the basis of discussion in this proposal. However, during execution of the work, other isotherms will be explored to determine the most appropriate for modeling refrigerant adsorption on the various types of aerogels that will be explored.

In this discussion, it is assumed that the fractional coverage of active sites on the surface of the aerogel by adsorbed refrigerant can then be calculated from the Langmuir parameter and the gas-phase chemical activity of the species being adsorbed. The chemical activity is proportional to gas-phase above the surface where adsorption is occurring. Langmuir adsorption isotherms have been predicted for various compounds, including iso-butane on zeolites, as a function of pressure and temperature. In the case of iso-butane adsorbed on zeolite, predictions were based upon Langmuir parameters determined from the regression analysis of published data. In this specific case (isobutene on zeolite), temperature changes induced by solar heating appear to be insufficient to cause enough change in surface coverage and gas-phase pressure to drive a practical refrigeration cycle. Similar predictions have been made with optimized combinations of refrigerant and adsorption media (optimum specified in terms of predicted Langmuir parameter). In this optimized case, temperature changes induced by solar heating do appear to be sufficient to cause enough change in surface coverage and gas-phase pressure to drive a practical refrigeration cycle.

In some embodiments a predicted Langmuir adsorption isotherms for more optimal combination of refrigerant and adsorption media may be utilized such that each data series plotted representing the temperature in Fahrenheit, and one possible refrigeration cycle shown on left; and (b) hypothetical iso-butane refrigeration cycle depicted on a pressure-enthalpy chart shown on right.

In preferred embodiments of the presently disclosed invention, particularly regarding temperature swing or pressure swing gas absorption systems, desorbed gas leaves one bed (thermal desorption), and is adsorbed on a second bed (adsorption bed). Operationally, these two beds operate approximately 180 degrees out of phase, with one serving as the "pitcher" and the other serving as the "catcher" using a baseball analogy. When the second bed becomes saturated, the roles are reversed, and the process repeats giving essentially continuous operation, as we had with the potential swing CDI system, in some approaches.

Carbon aerogels (CAs) with extremely high mass-specific surface area (up to about 3000 $m^2/g$) has been investigated for use in some embodiments described herein. CAs are novel mesoporous materials which combine many interesting properties such as low mass densities, continuous porosities, high surface areas, high electrical conductivities, and excellent mechanical properties. The properties of CAs are derived from their microstructure, which is typically a network of interconnected primary particles with characteristic diameters of between about 3 nm and about 25 nm, though the dimensions could be higher and/or lower. The material forms macroscopic (for instance, mm-sized) monolithic bodies that support compressive stress and shear stress.

According to some embodiments, the properties of CAs can be tailored for specific applications by controlling their morphology and/or by adding surface functionalities. The design of new porous carbon materials holds technological promise for a variety of applications, including catalysis, hydrogen storage, and energy storage. The utility of these materials may be derived from their high surface areas, electrically conductive frameworks, and chemical stability. CAs are a unique class of porous carbons that possess ultrafine cell sizes, continuous porosities, and low mass densities. These properties arise from the aerogel microstructure, a three-dimensional network of interconnected primary carbon particles with diameters that can range from a few nanometers to several microns. In contrast to the metallic bonding in nanoporous Au, CAs are a covalently bound material which makes them more stable against thermal coarsening. In addition, the graphitic character of the CA surface adds further stability to the structure.

Figure 2:
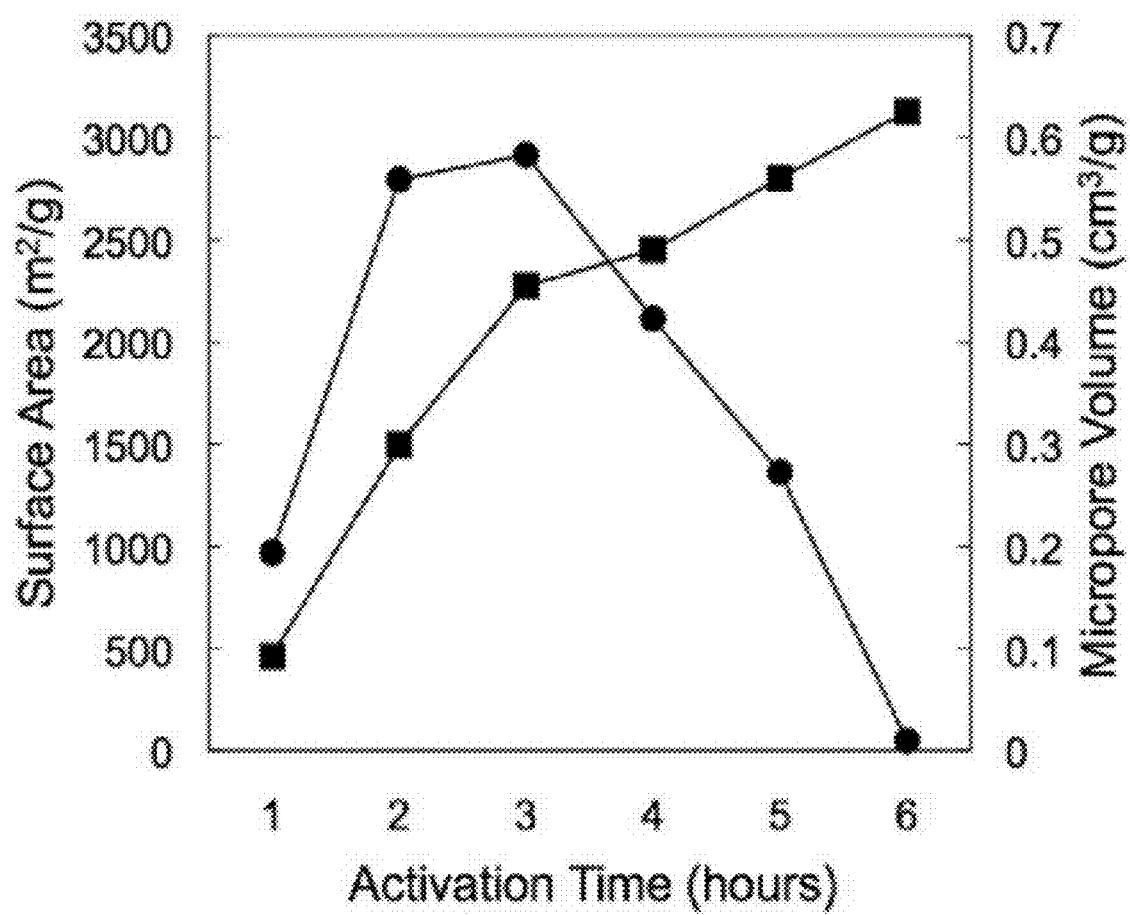
FIG. 2 is a plot showing BET surface area (square markers) and micropore volume (circular markers) for activated CAs as a function of activation time.
Figure 3:
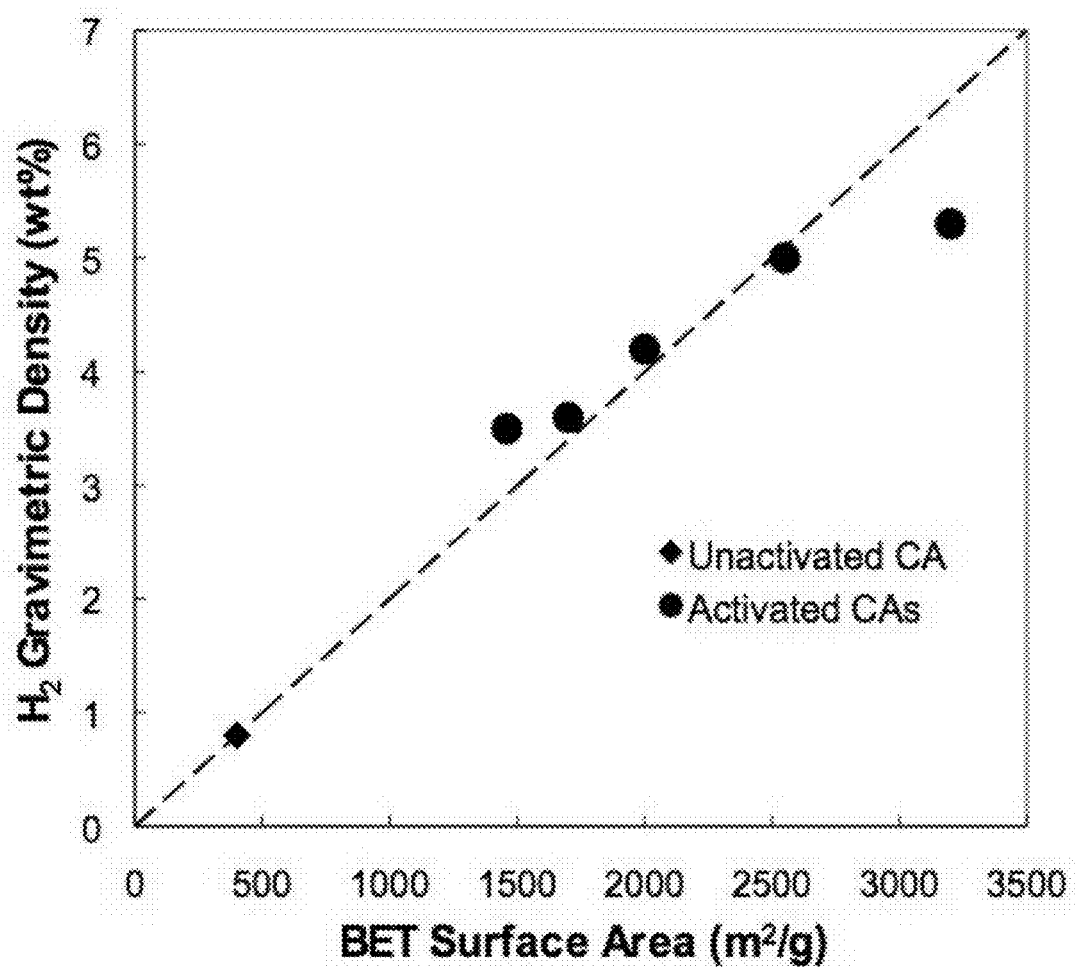
FIG. 3 is a plot of excess gravimetric density (wt % $H_2$) saturation value at 77K as a function of BET surface area. The dotted line shows correlation of 1 wt % per 500 $m^2/g$.

According to some approaches, CAs may be prepared through a sol-gel polymerization of organic precursors, such as resorcinol and formaldehyde, in aqueous solution to produce highly cross-linked organic gels that are supercritically dried and subsequently pyrolyzed in an inert atmosphere. Pyrolysis of the organic aerogel then yields a porous carbon network, comprised of both amorphous and graphitic regions, as shown in FIG. 2, which includes SEM images of the pre-activated CA in (a), and an activated CA with a surface area of 3200 m$^2$/g in (b). The graphitic domains are typically quite small and include a significant amount of disorder. Unlike many other porous carbons, CAs may be fabricated in a variety of forms, including monoliths and thin films, a feature that can be advantageous for many applications.

The structure-property relationships of CAs are largely determined by the sol-gel reaction chemistry. Several factors of the polymerization reaction have a significant impact on network formation in these materials. For example, the amount and type of polymerization catalyst used in the sol-gel reaction influences nucleation, growth, and interconnectivity of the primary particles that comprise the aerogel framework. The morphology and spatial arrangement of these particles, in turn, may determine the bulk physical properties of the CA. For instance, electrical conductivity in CAs occurs through the movement of charge carriers through individual carbon particles and "hopping" of these carriers between adjacent carbon particles. Therefore, charge transport is highly dependent on interconnectivity of the carbon network. Likewise, a number of other bulk properties, such as specific surface area, compressive modulus, and thermal conductivity, correlate with the network architecture and, therefore, can be tuned through the reaction chemistry.

Utilizing this flexibility, a synthetic approach to fabricate mechanically robust, high surface area CA monoliths has been developed for energy storage applications. This approach to access high surface areas in monolithic parts involved the thermal activation of a CA material with structural features (particles and pores) on the micrometer scale. The microstructure of traditional CAs, having nanometer-sized carbon particles and tortuous pore structures, can both limit the attainable surface areas through activation and lead to inhomogeneous activation in monolithic samples. By utilizing CAs with larger pore and particle sizes, however, these issues can be mitigated and monolithic CAs with BET surface areas in excess of 3000 m$^2$/g can be prepared. These values are greater than the surface area of a single graphene sheet (e.g., 2630 m$^2$/g, if both graphene surfaces are taken into account). Presumably, edge termination sites constitute a substantial fraction of the surface area in these activated CAs, as is the case for traditional high surface area activated carbons. Another benefit of this design strategy is that the process yields materials with bimodal porosity (macropores and micropores). Hierarchically porous carbons of this type present a number of advantages over unimodal carbon structures in terms of diffusion efficiency and surface area. Therefore, this approach offers viability to engineer new materials for use as catalyst supports, electrodes, capacitors, sorbent systems, etc.

The CA structure used for activation may be prepared by the sol-gel polymerization of resorcinol and formaldehyde using acetic acid as the reaction catalyst. Of course, any materials suitable for sol-gel polymerization may be used as would be known to one of skill in the art. The skeletal structure of this material includes interconnected micron-sized carbon ligaments that define a continuous macroporous network, as shown in FIG. 1. These ligaments appear to be made up of spherical primary particles that have fused together during network formation. This structural motif is likely responsible for the enhanced mechanical integrity of these CA monoliths, both before and after activation. Despite being macroporous, the pre-activated CA still exhibits appreciable surface area (about 400 m$^2$/g) due to microporosity within the carbon ligaments. To increase the accessible surface area in this material, the CA can be thermally activated with carbon dioxide. Thermal activation involves the controlled burn-off of carbon from the network structure in an oxidizing atmosphere resulting in the creation of new micropores as well as opening of closed porosity in the CA framework. Examination of the CAs following activation shows smaller network ligaments relative to the unactivated material, due to burn-off of carbon from the aerogel framework, as shown in FIG. 2, a graph of the BET surface area (square markers) and micropore volume (circular markers) for the activated CAs as a function of activation time. As expected, the BET surface areas of the activated CAs increase with the length of activation. At shorter activation times, this new porosity is in the form of micropores (pores smaller than about 2 nm), as evidenced by the steady increase in micropore volume for materials up to about 2500 m$^2$/g.

At longer activation times, however, the micropore volume in these materials drops precipitously. This observation can be attributed to the widening of micropores during activation to sizes that cross the micropore-mesopore boundary, leading to the formation of "supermicropores" and/or small mesopores at longer treatment times. While these general trends are similar to those observed in other activated CAs, the key difference with these materials is that the larger network features of the pre-activated CA allows access to surface areas in excess of about 3000 m$^2$/g, the highest values for a CA. Interestingly, despite the significant mass loss, the activated materials remained monolithic and retained a high degree of mechanical integrity following activation. Due to their hierarchical pore structure and high accessible surface areas as well as their ability to be fabricated as conformable shapes, these materials have potential in a variety of applications, including those described herein, according to several embodiments.

In some embodiments, the carbon aerogel has a bimodal pore size distribution comprising macropores having an average diameter (between opposing inner surfaces) of greater than about 50 nm and micropores having an average diameter of less than about 2 nm. The macropores provide for efficient diffusion and mechanical stability, while the micropores provide the desirable high surface area.

Figure 4:
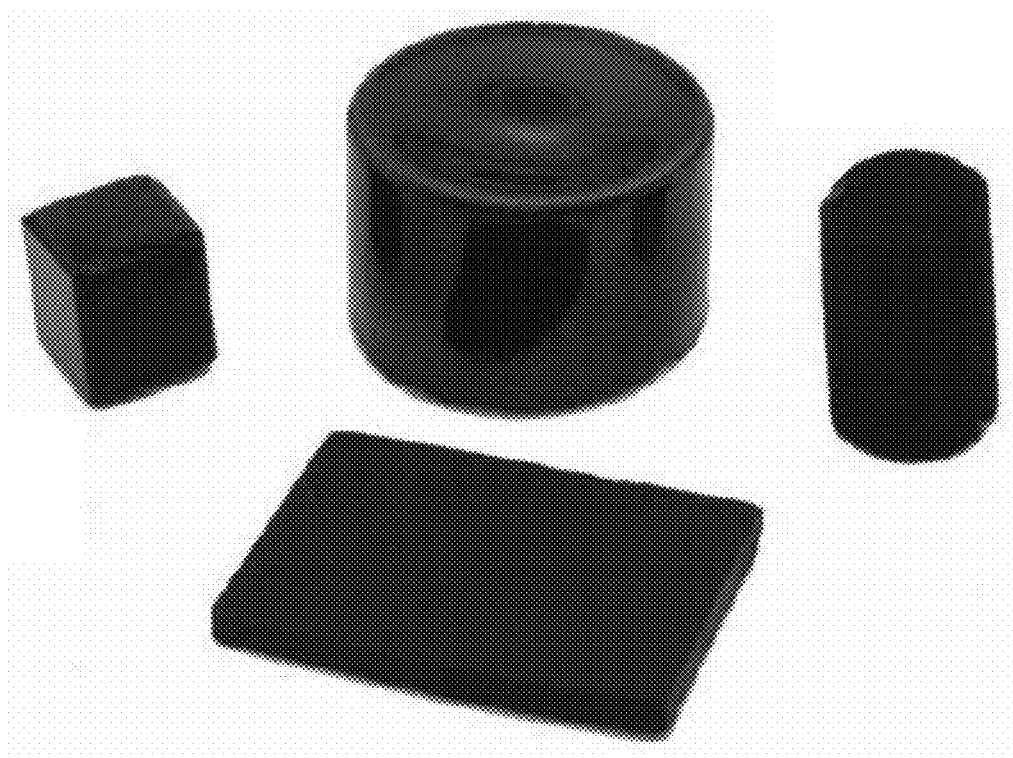
FIG. 4 depicts various possible shapes of CAs according to illustrative embodiments.

To illustrate the high surface area of CA's, FIG. 4 is a graph showing excess gravimetric density (wt % H$_2$) saturation value at 77 K as a function of BET surface area for activated and unactivated CAs. As shown, the amount of surface excess hydrogen adsorbed on porous carbons at 77 K and about 3.5 MPa varies linearly with BET surface area; gravimetric uptake is about 1 wt % H$_2$ per 500 m$^2$/g of surface area. The dotted line shows the correlation of 1 wt % per 500 m$^2$/g. This figure also speaks to the ability of the CA to act as a hydrogen storage medium.

Surface modifications of CAs, or nanoporous bulk materials in general, offer yet another means to further add functionalities to these already extremely versatile materials. A good example is the catalytic activity of Pt doped CAs. Although straightforward in theory, the infusion of metals or metal oxides into nanoporous bulk materials is difficult in reality due to their extremely high aspect ratios. Consequently, techniques commonly used for macro-cellular foams result in inhomogeneous or incomplete coatings. The diffusion limitation can be overcome by employing atomic layer deposition (ALD) which is a special variant of the chemical vapor deposition technique based on a suitable pair of sequential, self-limiting surface reactions, as shown in FIG. 4, a schematic diagram of an ALD method which employs sequential, self-limiting surface reactions to overcome diffusion limitations, according to one embodiment. Both conformal films (left) and individual nanoparticles (right) can be grown, depending on the surface chemistry. Consequently, the technique offers excellent atomic level control of the deposited film thickness.

Figure 5:
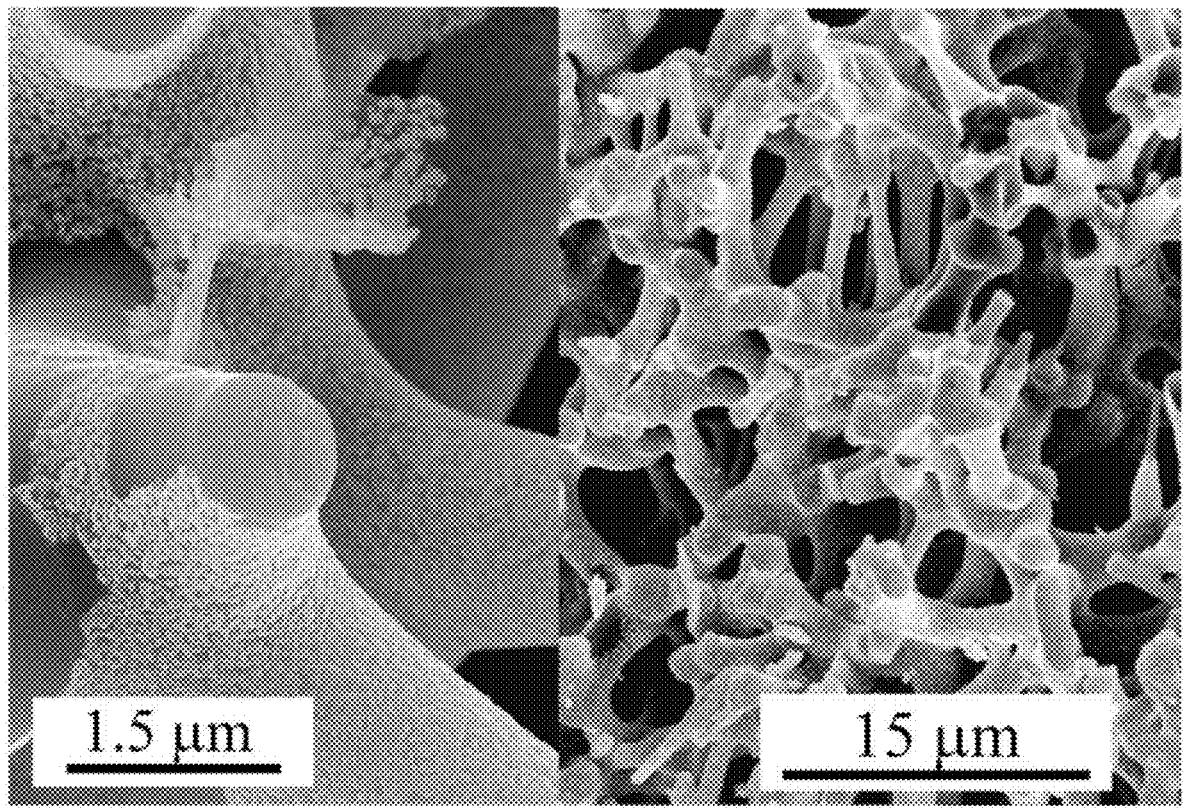
FIG. 5 includes SEM micrographs of the fracture surface of a Ru-coated CA at different magnification levels.

The method can be used for both oxidic and metallic deposits, and generates only volatile co-products, thus eliminating the necessity to perform additional reduction and cleaning steps. The morphology of the deposited material depends on the specific surface chemistry, and can range from individual nanoparticles to conformal films thus offering another powerful tool in the design of new nanoporous materials. This technique was used to deposit W, Ru, Pt, Cu, $TiO_2$, and ZnO on various aerogel templates, and generally good results were observed in terms of uniformity and conformality of the deposits as long as the vapor pressure of the precursor species is sufficiently high. A typical example is shown in FIG. 5 which demonstrates the formation of a continuous layer of Ru nanoparticles on the internal surfaces of a CA sample in two SEM micrographs of the fracture surface of a Ru-coated CA at different magnification levels. Note that the CA in FIG. 5 was not activated prior to depositing the Pt.

Figure 6:
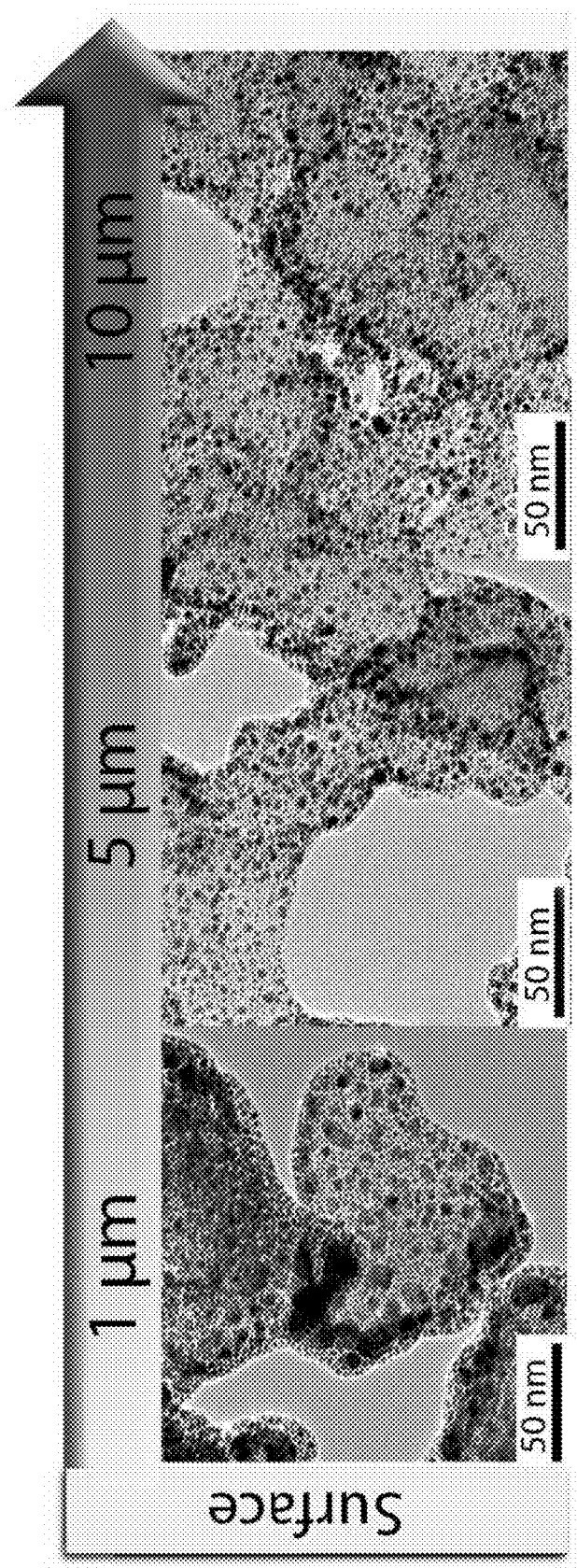
FIG. 6 shows the morphology of a Pt loaded CA (10 ALD cycles) in cross-sectional TEM micrographs revealing the high dispersion of Pt. The images were taken at different depths below the outer surface.
Figure 7:
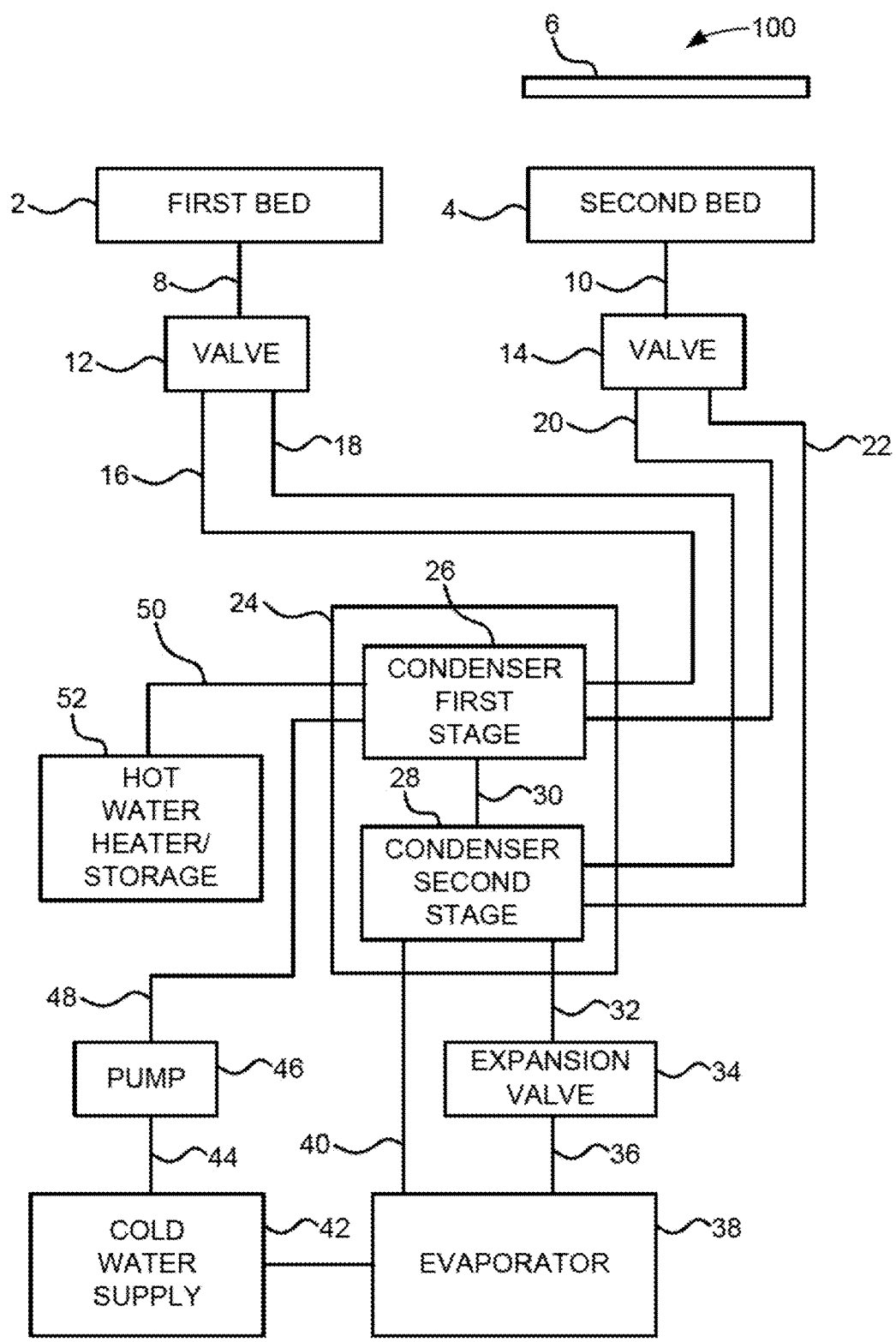
FIG. 7 illustrates one embodiment of an adsorption-desorption refrigeration system (ADRS) constructed in accordance with the present descriptions, according to one embodiment.

Platinum nanoparticle loaded high surface area carbon materials have become the most commonly used cathode catalysts in proton-exchange membrane fuel cells (PEMFCs) and direct methanol fuel cells (DMFCs). However, in order to achieve economic viability, the Pt loading needs to be further reduced to values below 1 $mg/cm^2$, according to some approaches. In order to achieve this, ALD is a promising alternative to traditional techniques such as wet impregnation as it offers precise control of the amount of deposited material, in some approaches. FIG. 7 shows the morphology of a Pt loaded CA (10 ALD cycles) in a series of cross-sectional TEM micrographs revealing the high dispersion of Pt. The images were taken at different depths below the outer surface. Note that the CA in FIG. 6 was not activated prior to depositing the Pt.

To enhance mass transport to or from deep within the structure, channels, e.g., holes, vias, etc. may be formed in the structure, e.g., by forming the material around a mold, by drilling, etc. This is useful to ensure more uniform application of the deposits, which in turn reduces potential gradients in actuation which could occur if the activation of the structure is not uniform throughout.

In summary, ALD is an efficient means to add catalytic activity to an otherwise inert nanoporous support. This allows the combination of the catalytic activity of metal surfaces with the robustness and flexibility offered by CAs.

In some approaches, the carbon aerogel may have a mass-specific surface area of greater than about 2000 $m^2/g$, and in some further approaches, greater than about 2800 $m^2/g$. In preferred approaches, the carbon aerogel may have a mass-specific surface area of greater than 3000 $m^2/g$ and in particularly preferred approaches the carbon aerogel may have a mass-specific surface area of at least 3200 $m^2/g$.

In more approaches, the carbon aerogel may include a network of interconnected primary particles, the primary particle having a characteristic diameter of between about 3 nm and about 25 nm. In further approaches, the characteristic diameter may be between about 3-10 nm, between about 5-15 nm, between about 12-25 nm, between about 5-20 nm, etc. as would be understood by one having ordinary skill in the art upon reading the present descriptions.

In one embodiment, a highly adsorptive structure includes a substrate and a carbon aerogel adhered to the substrate, wherein the carbon aerogel is characterized by having physical characteristics of in-situ formation on the substrate. As understood herein, in-situ formation on the substrate includes any formation process where a carbon aerogel is formed directly on the substrate surface from constituent carbon aerogel components as described above.

In some approaches, the substrate may be characterized as a thermally conductive substrate, such as a substrate comprising a metal or a metal alloy, a substrate comprising a carbon-containing structure such as a carbon aerogel, single-walled carbon nanotubes (SWCNT) multi-walled carbon nanotubes (MWCNT), etc. as would be understood by one having ordinary skill in the art upon reading the present descriptions. In particular, it is advantageous to utilize a substrate which facilitates conduction of thermal energy between the substrate and a carbon aerogel bound or adhered thereto, and/or in contact with the substrate.

In more embodiments, the substrate may include a plurality of microchannels adapted for interfacing with a carbon aerogel. Moreover, according to such embodiments the physical characteristics of in situ formation on the substrate may include the carbon aerogel being adhered to an interior and/or an exterior surface of one or more of the plurality of microchannels. As will be understood by one having ordinary skill in the art upon reading the present descriptions, a substrate having a plurality of microchannels increases available surface area for carbon aerogel binding or adhesion and thus improves the overall adsorption/desorption performance of an adsorptive cooling system employing a highly adsorptive structure such as the inventive carbon aerogel disposed on a substrate surface having a plurality of microchannels as described herein. Moreover, the increased surface area provides improved cooling capacity to such systems as compared to typical adsorptive cooling systems employing a carbon aerogel monolith positioned within a canister-type container substantially as described in U.S. patent application Ser. No. 12/848,564 to Farmer, et al. which is herein incorporated by reference.

In still more embodiments, the physical characteristics of in situ formation may include additional characteristics such as the carbon aerogel having an exterior surface substantially conformal to the substrate positioned adjacent thereto. As will be appreciated by one having ordinary skill in the art upon reading the present descriptions, in situ formation of a monolithic structure results in the monolith taking a form substantially conformal to that of the substrate in and/or on which in situ formation occurs. However, in some approaches, the in situ formation comprises a casting process and accordingly the physical characteristics of in situ formation on the substrate may include a volumetric reduction of the carbon aerogel. In particular, the carbon aerogel may take the form of a monolithic structure having a surface facing the substrate that is substantially conformal to the surface of the substrate adjacent thereto, as would be understood by one having ordinary skill in the art upon reading the present descriptions.

As referred to herein, volumetric reduction may be understood as a reduction in the surface area of the outer surface of the carbon aerogel, creating an apparent volumetric reduction. While the actual volume of the carbon aerogel monolith may remain constant as measured by displacement, the apparent volumetric size of the monolithic structure is slightly reduced, creating what is referred to herein as a volumetric reduction of the carbon aerogel. Advantageously, such a volumetric reduction facilitates ingress and/ or egress of fluids to and from the carbon aerogel, such as a refrigerant in some approaches.

In more approaches, highly adsorptive materials as described herein may include a carbon aerogel substantially embodied as a monolithic structure having a surface facing the substrate that is substantially conformal to the surface of the substrate adjacent thereto. As will be appreciated by one having ordinary skill in the art upon reading the present descriptions, the carbon aerogel surface facing the substrate, and having experienced a slight volumetric reduction as described above experiences a recession of the aerogel exterior surface from the substrate surface, but in a substantially uniform fashion such that the surface of the aerogel remains substantially conformal to the substrate surface from which it receded during volumetric reduction.

In even more embodiments, the highly adsorptive structures described herein may be characterized such that the substrate includes a plurality of microchannels. As understood herein, microchannels may constitute any suitable microstructure which increases surface area of a substrate upon which the microchannels are arranged. For example, in some approaches microchannels in the substrate may include a plurality of etches, grooves, microcapillaries, ridges, etc. as would be understood by one having ordinary skill in the art upon reading the present descriptions. Moreover, according to such embodiments the physical characteristics of in situ formation on the substrate may include the carbon aerogel being adhered to an interior and/or exterior surface of the plurality of microchannels.

Figure 15A:
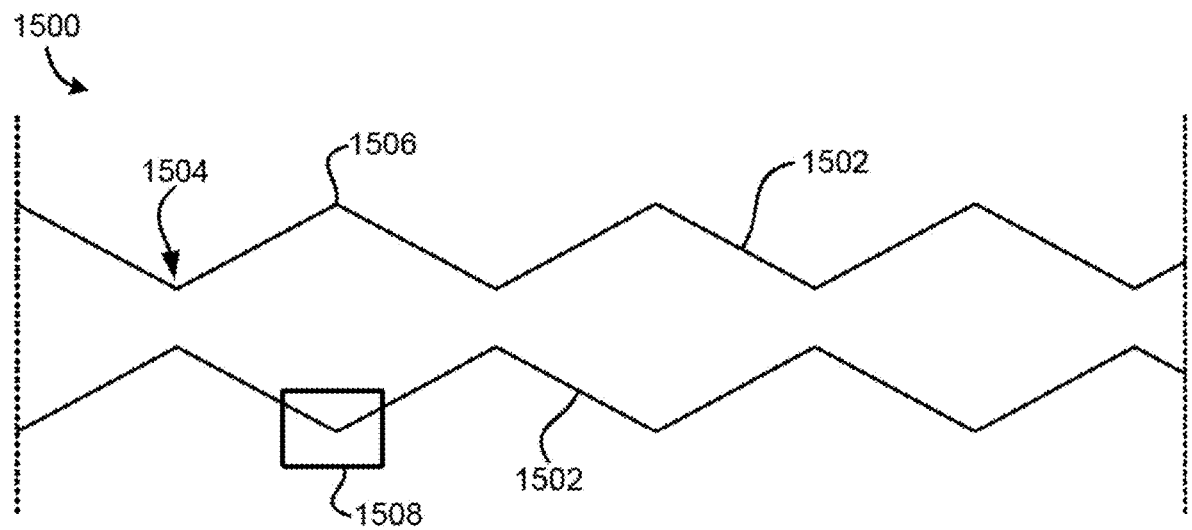
FIG. 15A illustrates a substrate having a corrugated surface, according to one embodiment
Figure 15B:
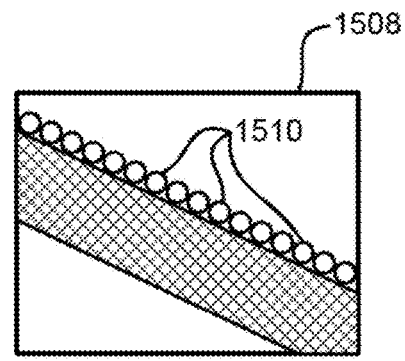
FIG. 15B illustrates a substrate having a plurality of microchannels arranged along a surface of the substrate, according to one embodiment.
Figure 15C:
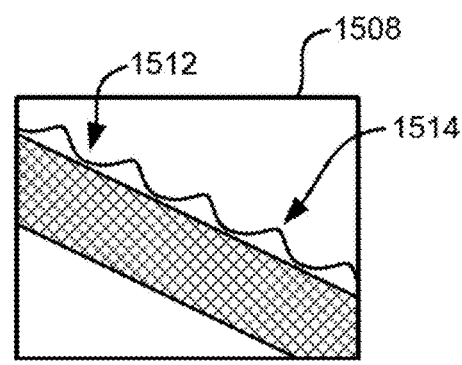
FIG. 15C illustrates a substrate having a plurality of microchannels arranged along a surface of the substrate, according to one embodiment.

As will be understood by one having ordinary skill in the art, adherence to an interior and/or exterior surface of the plurality of microchannels encompasses any binding or adhesion of carbon aerogel to any portion of the interior surface of the microchannel (e.g. the interior of microcapillaries 1510 as shown in FIG. 15B; a valley of a groove such as valley 1512 of FIG. 15C, etc. as would be understood by one having ordinary skill in the art upon reading the present descriptions.) Similarly, adherence to an interior and/or exterior surface of the plurality of microchannels encompasses any binding or adhesion of carbon aerogel to any portion of the exterior surface includes binding or adhesion to the outer surface of microcapillaries 1510 as shown in FIG. 15B, as well as binding or adhesion to a peak of a microchannel groove such as peak 1514 as shown in FIG. 15C.

Moreover, in many approaches the microchannels may improve overall surface area and thus adsorptive cooling potential of a structure employing a highly adsorptive structure as described herein. Such improvements may be further attributed at least in part to the fact that the microchannels provide ingress and egress paths for ambient gases, e.g. a refrigerant gas for an adsorptive cooling system. Of course, the microchannels may provide ingress and egress paths for fluids other than gases, as would be understood by the skilled artisan reading the present descriptions.

Moreover still, in some approaches the carbon aerogel may be biased toward the substrate for increasing a thermal conductivity between the carbon aerogel and the substrate. Surprisingly, improvements to thermal conductivity are achievable without the use of a conductive paste as is typically required.

The highly adsorptive structure as described herein may further include a refrigerant adsorbed to the carbon aerogel in some approaches. In preferred embodiments, the refrigerant desorbs from the carbon aerogel at a temperature of less than about 90° C.

In still more embodiments, the highly adsorptive structure may have an enclosing container having an opening configured for ingress and egress, e.g. of a refrigerant. In such embodiments, the enclosing container may be further adapted for integration with a circulation system, e.g. a circulation system adapted for circulating the refrigerant to and from the highly adsorptive structure.

Methods of Fabrication

As described herein, the inventive carbon aerogel and substrate product may be fabricated according to the following process.

Figure 16A:
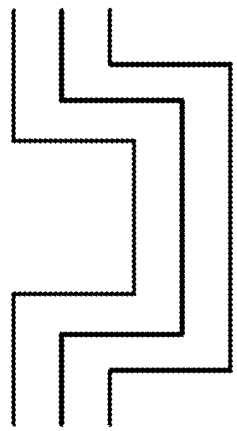
FIG. 16A shows one arrangement for a plurality of microchannels arranged along a surface of the substrate, according to one embodiment.
Figure 16B:
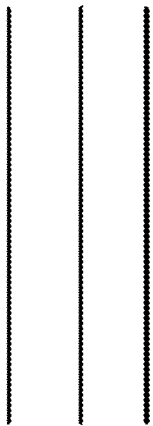
FIG. 16B shows one arrangement for a plurality of microchannels arranged along a surface of the substrate, according to one embodiment.
Figure 16C:
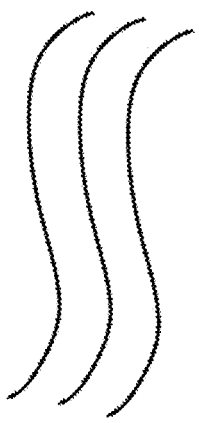
FIG. 16C shows one arrangement for a plurality of microchannels arranged along a surface of the substrate, according to one embodiment.
Figure 16D:
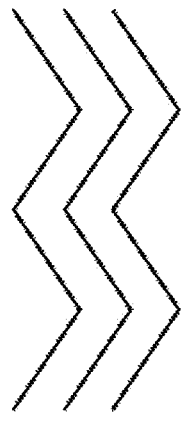
FIG. 16D shows one arrangement for a plurality of microchannels arranged along a surface of the substrate, according to one embodiment.
Figure 17:
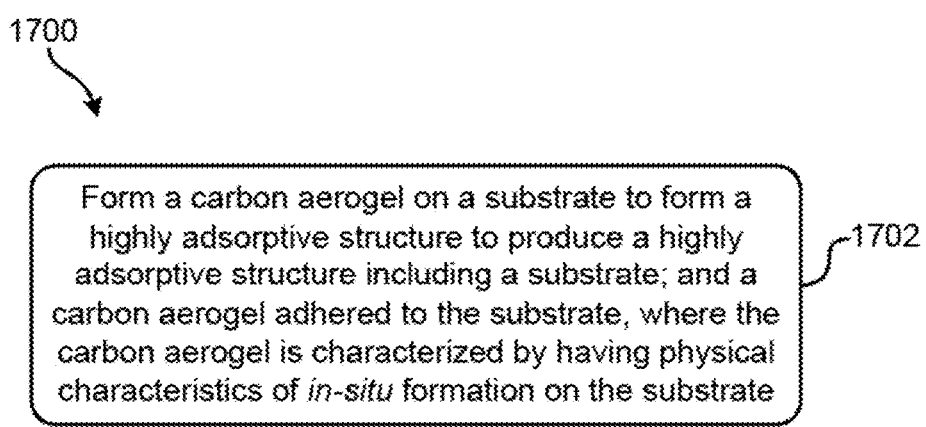
FIG. 17 shows a flowchart of a method, according to one embodiment.

Referring now to FIG. 17 a method 1700 is shown, according to one embodiment. As described herein, the method 1700 may be implemented in any suitable environment, including those depicted in FIGS. 1-16, among others.

As shown in FIG. 17 the method 1700 initiates with operation 1702, where a carbon aerogel is formed to the substrate to produce a highly adsorptive structure including a substrate; and a carbon aerogel adhered to the substrate, where the carbon aerogel is characterized by having physical characteristics of in-situ formation on the substrate.

In some approaches, the substrate includes a plurality of microchannels such as grooves, etches, ridges, microcapillaries, etc. as would be understood by one having ordinary skill in the art upon reading the present descriptions.

Adsorptive Cooling System Utilizing Highly Adsorptive Carbon Aerogel Materials

The present disclosure provides a solar-powered adsorption-desorption refrigeration and air conditioning system that uses nanostructural materials such as aerogels, zeolites, and sol gels as the adsorptive media. As disclosed herein, refrigerant molecules may be adsorbed on the high surface area of the nanostructural material while the material is at a relatively low temperature, perhaps at night. During daylight hours, when the nanostructural materials are heated by thermal energy, the refrigerant molecules may be thermally desorbed from the surface of the aerogel, thereby creating a pressurized gas phase in the vessel that contains the aerogel in some approaches. This thermally controlled pressurization may force the heated gaseous refrigerant through a condenser, followed by an expansion valve. In the condenser, heat may be removed from the refrigerant, first by circulating air or water. Eventually, the cooled gaseous refrigerant may expand isenthalpically through a throttle valve into an evaporator.

In one embodiment, the present disclosure provides a thermally controlled adsorption-desorption refrigeration system. During Phase 1, incident thermal radiation may cause heating of the first bed of high specific surface area adsorption media (Bed A), which then may cause thermal desorption of the refrigerant in one approach. Refrigerant desorption may increase the gas-phase pressure in the pores of the adsorption media, thereby forcing the gaseous refrigerant to flow out of the adsorption bed, through a two-stage condenser. While passing through the two-stage condenser, heat may be first removed from the hot gaseous refrigerant by a stream of water that eventually flows into a hot water heater and storage system in another approach. Then, the refrigerant may be further cooled by chilled refrigerant leaving the evaporator after vaporization. After passing through the two-stage condenser, the gaseous refrigerant may undergo expansion, e.g. isenthalpic expansion, through an expansion valve in yet another embodiment. A portion of the refrigerant may condense in the evaporator, while some of the refrigerant may be flashed, such that some of the refrigerant may change state from a liquid to a gas while absorbing heat from the remaining liquid refrigerant, and exit the evaporator. The evaporator may absorb heat from the room or area being cooled, which may result in further vaporization of the refrigerant. Further, in another embodiment, the cool, vaporized refrigerant may then leave the evaporator, passing through tubes in the shell-and-tube heat exchanger comprising the second stage of the two-stage condenser. Once leaving the tube-side of this heat exchanger, the cool, vaporized refrigerant may flow to the second bed of adsorption media (Bed B), which may be maintained at a lower temperature than the first bed in some approaches. Moreover, in some embodiments, the entire system may be allowed to cool at relatively cool ambient temperatures, e.g. at night, and most of the refrigerant may adsorb on the second adsorption bed (Bed B). During the second phase, the refrigeration cycle may be reversed, with thermal desorption from Bed B and adsorption on the cooler Bed A in some approaches.

Systems and methods in accordance with the present disclosure may be used for various purposes, including but not limited to climate control. Additionally, the present disclosure may be used for cooling homes and commercial buildings; cooling passenger compartments in various vehicles, including cars, trucks, commercial ships, and airplanes; cooling of high performance computing machines and electronics; cooling advanced energy conversion and storage devices, including batteries; cooling office buildings and laboratories; cooling passenger compartments in military vehicles including trucks, tanks, armored personnel carriers, naval ships, submarines, airplanes, and spacecrafts; and for cooling other structures, devices, vehicles, etc. as would be understood by one having ordinary skill in the art upon reading the present disclosure.

The system as disclosed herein may also be used in other appliances, including, but not limited to, hot water heaters, heaters, etc. and other such appliances as would be understood by one having ordinary skill in the art upon reading the present disclosure.

Figure 8:
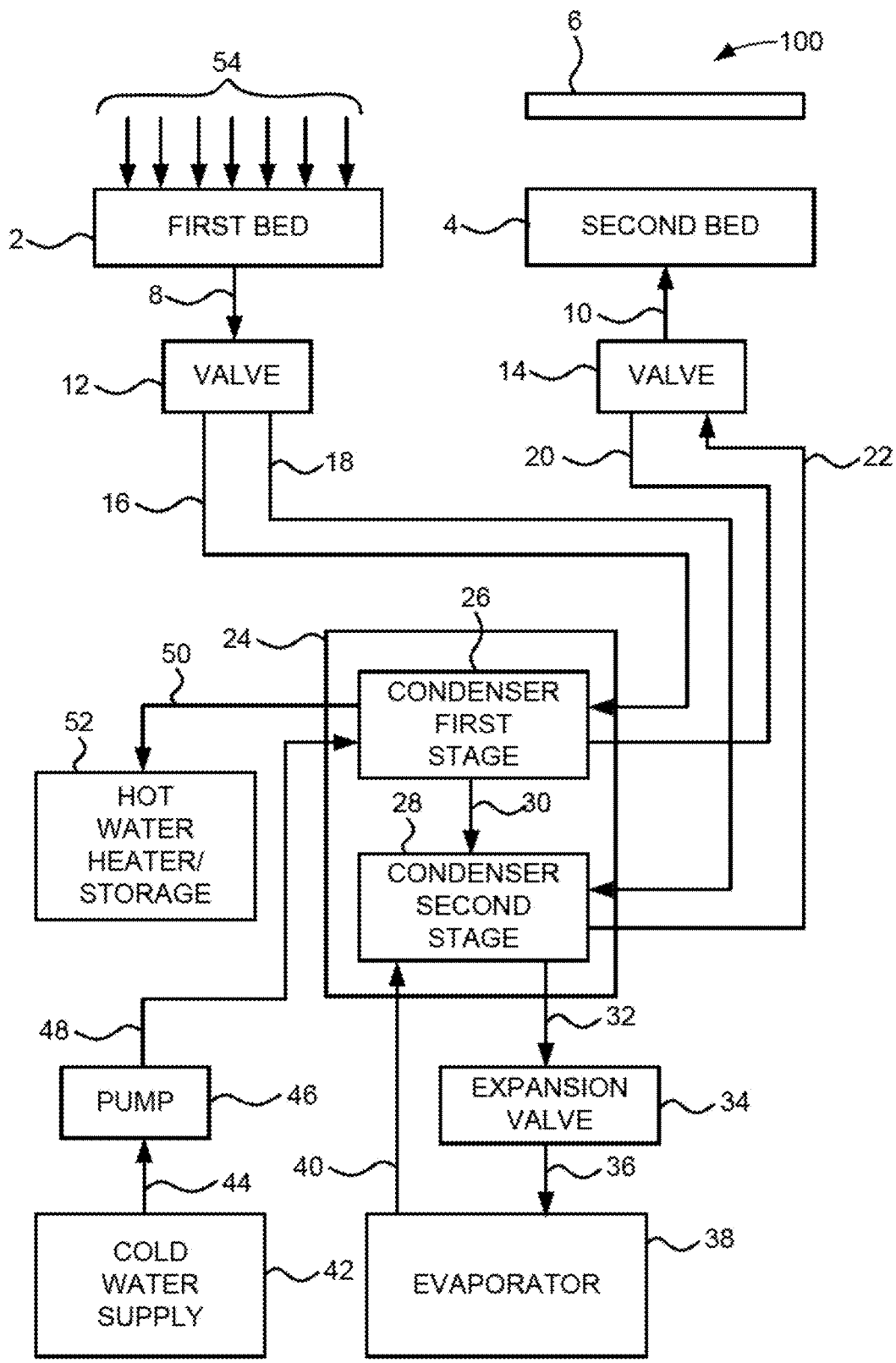
FIG. 8 illustrates phase 1 of the (ADRS).

Several embodiments of an adsorption-desorption refrigeration system (ADRS) constructed in accordance with the present disclosure are illustrated in FIGS. 1-8. For example, FIG. 8 illustrates one embodiment of a thermally controlled adsorption-desorption refrigeration system of the present disclosure. The thermally controlled adsorption-desorption refrigeration system may be designated generally by the reference numeral 14000. Reference numerals may be used to designate various components, systems, units, devices which are generally referred to below as "item(s)" in FIGS. 7-14.

As shown in FIG. 7, item 2 may be a first bed of high specific surface area adsorption media, including, but not limited to, a nanostructural foam, aerogel based media, etc. and other high specific surface area adsorption media as would be understood by one having ordinary skill in the art upon reading the present disclosure. In another embodiment, item 4 may be a second bed with the same properties of the first bed item 2. In yet another embodiment, item 6 may be a retractable sun shade that may be moved to cover or uncover either beds 2 or 4 or may be positioned to uncover both beds 2 and 4 at the same time. The beds of high specific surface area adsorption media, item 2 and item 6, may be any nanostructural material, including, but not limited to, an aerogel, a sol gel, a zeolite, etc. or any other nanostructural material as would be understood by one having ordinary skill in the art upon reading the present disclosure.

In one embodiment, item 2 may be any light blocking system adapted to selectively block energy from a thermal energy source, such as the sun, a heating element, waste heat, etc. or any other thermal energy source as would be understood by one having ordinary skill in the art upon reading the present disclosure. For example, item 2 may include, but is not limited to, a louvered shade, a shutter shade, an electronic light blocking system for blocking energy from a thermal energy source, etc. or any other system for blocking thermal energy as would be understood by one having ordinary skill in the art upon reading the present disclosure.

As shown in FIG. 7, item 12 may be a two-way valve that connects the first bed 2 to the two-stage condenser 24 in one approach. Item 16 may be a line that connects valve 12 to the condenser first stage 26 of the two-stage condenser in another approach. In yet another embodiment, item 18 may be another line that connects valve 12 to the second stage 28 of the two-stage condenser. Moreover, in one approach line 30 may connect the condenser first stage to the condenser second stage. Additionally, item 32 may be a line connecting the two-stage condenser to the expansion valve 34 and item 36 may connect the expansion valve 34 to the evaporator 38 in another approach. In yet another embodiment, item 40 may be a line connecting the evaporator 38 to the condenser second stage.

Item 10 as shown in FIG. 7 may be a line connecting the second bed 4 to a two-way valve 14 in one approach. In another approach, item 20 may be a line that connects valve 14 to the condenser first stage 26 and item 22 may be a line connecting valve 14 to the condenser second stage 28. Further, in one embodiment, item 42 may be a cold water supply, including, but not limited to, tap water entering a building, or other cold water supply as would be understood by one having ordinary skill in the art. Moreover, in another approach, item 44 may be a line connecting the cold water supply 42 to a pump 46 that through line 48 may connect to condenser first stage 26. Item 50 may be a line that connects condenser first stage 26 to a hot water heater/storage module 52 in yet another approach.

FIG. 8 illustrates one embodiment of phase 1 of the ADRS. The thermally controlled adsorption-desorption refrigeration system (ADRS) may be designated generally by the reference numeral 100. Incident thermal energy 54 may cause heating of the first bed 2, which, in turn, may cause thermal desorption of the refrigerant stored in bed 2 in one approach. Refrigerant desorption may increase the gas phase pressure in the pores of the adsorption media, and may thereby force the gaseous refrigerant (GS) to flow-out of the first bed 2. The GS may flow through line 8 to the two-way valve 12 and from there through line 16 to the condenser first stage 26 of two-stage condenser 24 in another approach. In the condenser first stage 26, heat may be removed from the GS by a stream of cold water supplied by cold water supply 42 and pump 46 in yet another approach.

As shown in FIG. 8, after removing heat from the GS, the warmed water may exit the condenser first stage by line 50 and may be stored in hot water storage module 52 according to one approach. This hot water may be used for other purposes in whatever structure the ADRS may be used. In another embodiment, the cooled GS may now enter, through line 30, the condenser second stage 28 where the GS may be further cooled by the chilled refrigerant leaving the evaporator 38 after vaporization. After passing through the two-stage condenser 24, the GS may undergo isenthalpic expansion in the expansion valve 34 in yet another embodiment.

Additionally, in one embodiment, a portion of the GS may condense in the evaporator 38 while some of the GS may be flashed (chilled refrigerant) and may exit the evaporator 38 as shown in FIG. 8. The evaporator 38 may absorb heat from the room or area being cooled, which may result in further vaporization of the GS. In another approach, the chilled vaporized GS may exit the evaporator 38 and through line 40 may enter the condenser second stage and may proceed through the tubes of a shell-and-tube heat exchanger, which comprises the condenser second stage 28 of the two-stage condenser 24. The GS may leave the condenser by way of line 22 and may pass through valve 14 and line 10 may be deposited in the-adsorption media of bed 4, which is at a lower temperature than the first bed 2 in yet another approach.

Figure 9:
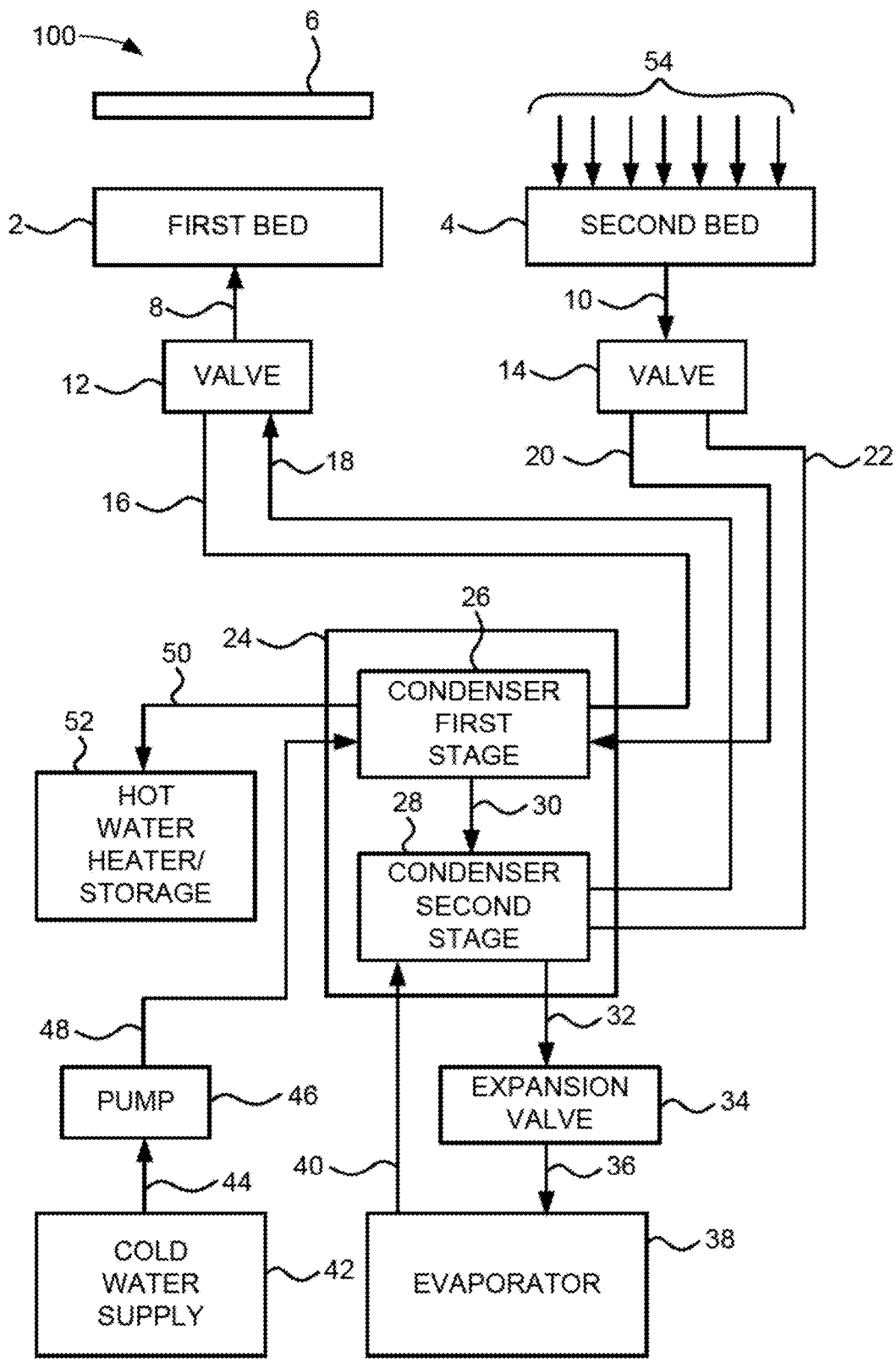
FIG. 9 illustrates phase 2 of the (ADRS).

FIG. 9 illustrates one embodiment of the second phase of the refrigeration cycle. During phase two, the second bed 4 may receive the thermal energy 54 and may heat the GS, which may flow through the ADRS in the reverse order and may end up adsorbed in bed 2, which is at a cooler temperature. This cycling between bed 2 and 4 may take place several times during a day depending on the size of the ADRS in some approaches. Some suitable examples of Non-Halogenated compounds with boiling points appropriate for use as refrigerants are tabulated in Table 1.

TABLE 1

| Name | Formula | FW | BP (° C.) | MP (° C.) | Density (g/cc) |
|---|---|---|---|---|---|
| carbon dioxide | CO2 | 44.0000 | −78.6000 | −56.6000 | 1.0310 |
| methyl silane | CH3SiH3 | 46.1200 | −57.0000 | −156.5000 | |
| propene or propylene | CH3CHCH2 | 42.0800 | −47.4000 | −185.2000 | 0.5193 |
| propane | CH3CH2CH3 | 44.1100 | −42.1000 | −189.7000 | 0.5831 |
| propadiene or allene | ClH2CCH2 | 40.0700 | −34.5000 | −136.0000 | 0.7870 |
| ammonia | NH3 | 17.0300 | −33.3500 | −77.7000 | 0.7710 |
| cyclopropane | C3H8 | 42.0800 | −32.7000 | −127.6000 | 0.7200 |
| dimethyl ether | CH3OCH3 | 46.0700 | −25.0000 | −138.5000 | |
| methyl acertylene or propyne | CH3CCH | 40.0700 | −23.2000 | −105.5000 | 0.7062 |
| methyl phospine | CH3PH3 | 48.0600 | −14.0000 | | |
| vinyl chloride or chloroethylene | CH2CHCl | 62.0500 | −13.4000 | −153.8000 | 0.9106 |
| bromo difluoro nitroso methane | BrF2CNO | 159.9200 | −12.0000 | | |
| methyl nitrate | CH3ONO | 61.0400 | −12.0000 | −16.0000 | 0.9910 |
| isobutane | (CH3)2CHCH2 | 58.1200 | −11.7000 | −159.4000 | 0.5490 |
| isobutylene | (CH3)2CCH2 | 56.1100 | −6.9000 | −140.3000 | 0.5942 |
| 1-butene | CH3CH2CHCH3 | 56.1200 | −6.3000 | −185.3000 | 0.5951 |
| amino methane | CH3NH2 | 31.0600 | −6.3000 | −93.5000 | 0.6628 |
| 1,3 butadiene or bivinyl | CH2C2H2CH2 | 54.0900 | −4.4000 | −108.9000 | 0.6211 |
| butane | C4H10 | 58.1200 | −0.5000 | −138.4000 | 0.6012 |
| trans 2-butene | CH3CHCHCH3 | 56.1200 | 0.9000 | −105.5000 | 0.6042 |
| trimethyl amine | (CH3)3N | 59.1100 | 2.9000 | −117.2000 | 0.6356 |
| cis 2-butene | CH3CHCHCH3 | 56.1200 | 3.7000 | −138.9000 | 0.6213 |
| 1-butene-3-one | CH2CHCCH | 52.0800 | 5.1000 | | 0.7095 |
| vinyl acetylene | CH2CHCCH | 52.0800 | 5.1000 | | 0.7095 |
| methane thiol | CH3SH | 48.1100 | 6.2000 | −123.0000 | 0.8665 |
| fulwene | C6H6 | 78.1100 | 7.0000 | | |
| 1-butyne | CH3CHCCH | 54.0900 | 8.1000 | −125.7000 | 0.6784 |
| neopentane | (CH3)4C | 72.1500 | 9.5000 | −16.5000 | 0.6135 |
| butadiyne | CHCCCH | 50.0600 | 10.3000 | −36.4000 | 0.7634 |
| 1,2 butadiene or methylallene | CH2CCHCH3 | 54.0900 | 10.8000 | −136.2000 | 0.6760 |
| cyclobutane | C4H8 | 56.1200 | 12.0000 | −50.0000 | 1.0457 |
| acetaaldehyde | CH3CHO | 44.0500 | 20.8000 | −121.0000 | 0.7834 |
| methanol | CH3OH | 32.0400 | 65.0000 | −93.9000 | 0.7914 |
| cycloneptane | C7H14 | 98.1900 | 118.5000 | −12.0000 | 0.8098 |

Some suitable examples of halogenated compounds with boiling points appropriate for use as refrigerants are tabulated in Table 2.

TABLE 2

| Name | Formula | FW | BP (° C.) | MP (° C.) | Density (g/cc) |
|---|---|---|---|---|---|
| chloro trifluoro methane or Freon 13 | ClCF3 | 104.4600 | −81.1000 | −181.000 | |
| trifluoro acetonitrile | F3CCN | 95.0300 | −64.0000 | | |
| methylene fluoroide | CHF2 | 52.0200 | −51.6000 | | 0.9090 |
| 3,3,3-trifluoropropyne | F3CCCH | 94.0400 | −48.3000 | | |
| 1,1,1 trifluoroethane | CH3CF3 | 84.0400 | −47.3000 | −111.3000 | |
| nitroso-pentafluoro ethane | CF3CF2NO | 149.0200 | −42.0000 | | |
| chlorooo difluoro methane or Freon 22 | ClCHF3 | 86.4700 | −40.8000 | −146.0000 | |
| chloro pentafluoro ethane | ClCF2CF3 | 154.4700 | −38.0000 | −106.0000 | |
| fluoroethane | CH3CH2F | 48.0600 | −37.7000 | −143.2000 | 0.7182 |
| perfluorodimethyl amine | (CH3) 2NF | 171.0200 | −37.0000 | | |
| perfluoropropane | C3F8 | 188.0200 | −36.0000 | −183.0000 | |
| perfluoro ethyl amine | CF3CF2NF2 | 171$$02 | −35.0000 | | |
| trifluoro methyl peroxide | CF3OOCF3 | 170.0000 | −32.0000 | | |
| nitro trifluoro methane | F3CNO2 | 115.0100 | −31.1000 | | |
| dichloro difluoro methane or Freon 12 | Cl2CF2 | 120.9100 | −29.8000 | −158.0000 | 1.1834 |
| perfluoro propylene | CF3CFCF2 | 150.0200 | −29.4000 | −156.2000 | 1.5830 |
| 1,1,1,2 tetrafluoro ethane | CH3FCF3 | 102.0300 | −26.5000 | | |
| trifluoro methyl phosphine | F3COH2 | 102.0000 | −26.5000 | | |

TABLE 2-continued

| Name | Formula | FW | BP (° C.) | MP (° C.) | Density (g/cc) |
|---|---|---|---|---|---|
| 1,1 difluoro ethane | CH3CHF2 | 66.0500 | −24.7000 | −117.0000 | 0.9500 |
| perfluoro 2-butyne | CF3CCCF3 | 162.0400 | −24.6000 | −117.4000 | |
| methyl chloride | CH3Cl | 50.4900 | −24.2000 | −97.1000 | 0.9159 |
| fluoro formaldehyde | FCHO | 48.0000 | −24.0000 | | |
| iodo trifluoro methane | CF3I | 195.9100 | −22.5000 | | 2.3608 |
| trifluoromethyl sulfide | (CF3)2S | 170.0800 | −22.2000 | | |
| trifluoro methane sulfonyl fluoride | F3CSO2F | 152.0700 | −21.7000 | | |
| pentafluoro thio trifluoro methane | F3C(SF5) | 196.0600 | −20.0000 | | |
| vinyl chloride or chloroethylene | CH2CHCl | 62.0500 | −13.4000 | −153.0000 | 0.9106 |
| bromo difluoro nitroso methane | BrF2CNO | 159.9200 | −12.0000 | | |
| 1-nitroso heptafluoro propane | CF3CF2CF2NO2 | 199.0300 | −12.0000 | −150.0000 | |
| trifluoro ethoxyl silane | C2H5OSiF3 | 130.1500 | −7.0000 | −122.0000 | |
| hexafluorodimethylamine | (CF3)2NH | 153.0300 | −6.7000 | −130.0000 | |
| ethyl trifluoro silane | C2H5SiF3 | 114.1400 | −4.4000 | −105.0000 | 1.2270 |
| perfluoro cyclobutane | C4F8 | 200.0300 | −4.0000 | −38.7000 | |
| 3-fluoro propylene | FCH2CHCH2 | 60.0700 | −3.0000 | | |
| perfluoro methyl mercaptan | F3CSCl | 136.5200 | −0.7000 | | |
| 2,2 difluoro propane | (CH3)2CF2 | 80.0800 | −0.4000 | −104.8000 | 0.9205 |
| nitro pentafluoro ethane | CF3CF3NO2 | 165.0200 | 0.0000 | | |
| perfluoro 2-butane | CF3CFCFCF3 | 200.0300 | 0.0000 | −129.0000 | 1.5297 |
| trans 2-butane | CH3CHCHCH3 | 56.1200 | 0.9000 | −105.5000 | 0.6042 |
| 1,1,1,2,2,3 hexafluoro propane | CH2FCF2CF3 | 152.0400 | 1.2000 | | |
| perfluoro cyclobutene | C4F6 | 162.0400 | 3.0000 | −60.0000 | 1.6020 |
| methyl bromide | CH3Br | 94.9400 | 3.6000 | −93.6000 | 1.6755 |
| bromo acetylene | BrCCH | 104.9400 | 4.7000 | | |
| pentachloro benzyl chloride | C6Cl5COCl | 312.8000 | 5.0000 | 87.0000 | |
| hexafluoro 1,3 butadiene | CF2CFCFCF2 | 162.0400 | 6.0000 | −132.0000 | 1.5530 |
| 2-chloro 1,1,1 trifluoroethane | ClCH2CF3 | 118.4900 | 6.9300 | −105.5000 | 1.3890 |
| dichloro fluoro methane or Freon 21 | Cl2CHF | 102.9200 | 9.0000 | −135.0000 | 1.4050 |
| 2-fluoro 1,3 butadiene | CH2CFCFCF2 | 72.0800 | 12.0000 | | 0.8430 |
| acetyl fluoride | CH3COF | 62.0400 | 20.8000 | | 1.0020 |
| 1,2 dichloro 1,2 difluoro ethylene | CFClCFCl | 132.9200 | 21.1000 | −130.5000 | 1.4950 |
| 1-nitro heptafluoro propane | CF3CF2CF2NO2 | 215.0300 | 25.0000 | | |
| neopentyl chloride | (CH3)3CCH2Cl | 106.6 | 84.3000 | −20.0000 | 0.8660 |

Figure 10:
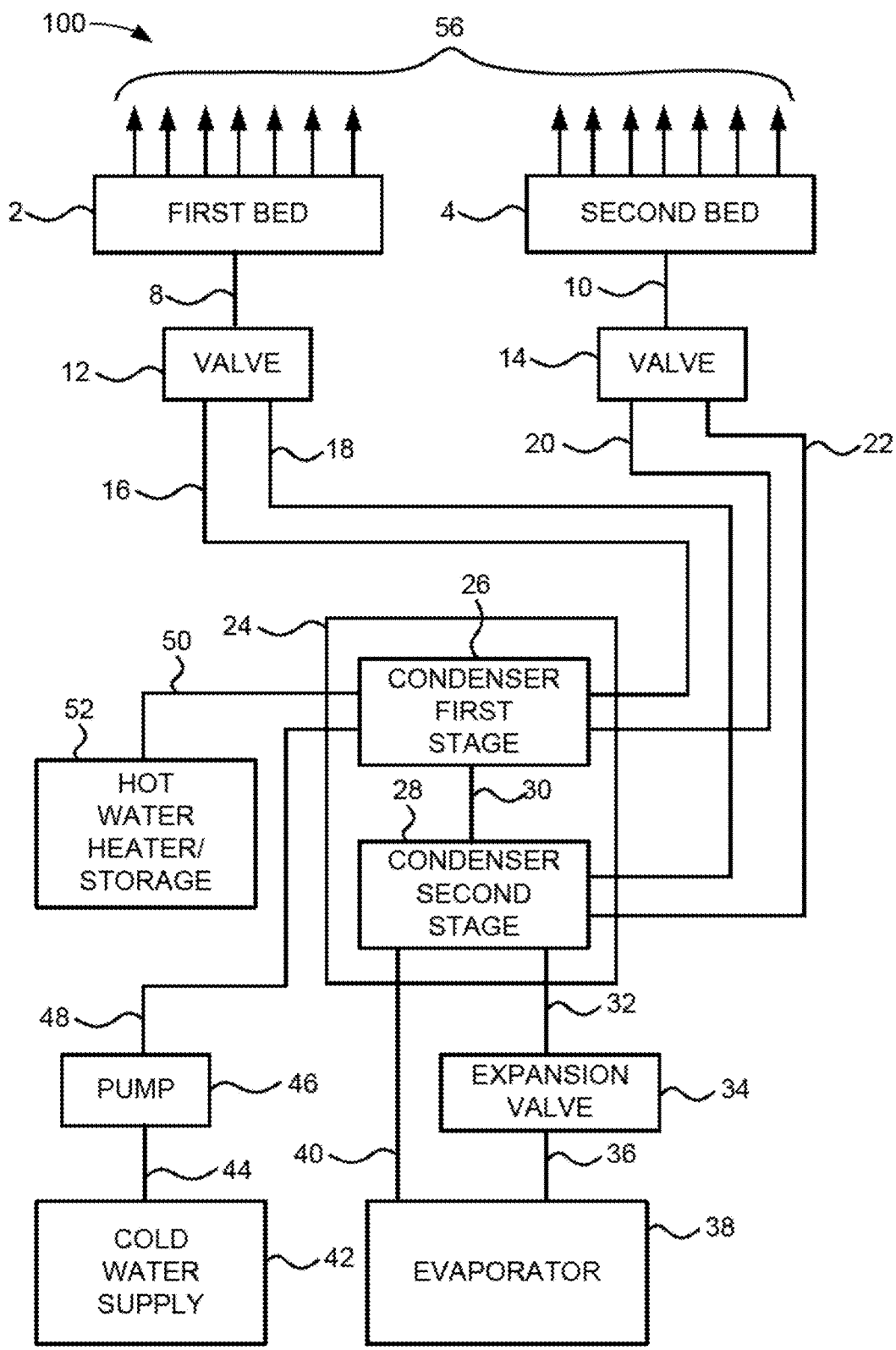
FIG. 10 illustrates the ADRS during a low-temperature period, according to one embodiment.

FIG. 10 illustrates one embodiment of the ADRS during the night time. The retractable sun shade 6 may be positioned to uncover both beds 2 and 4 and both beds may radiate heat 56. Most of the refrigerant may be adsorbed in bed 4 in some approaches.

Figure 11:
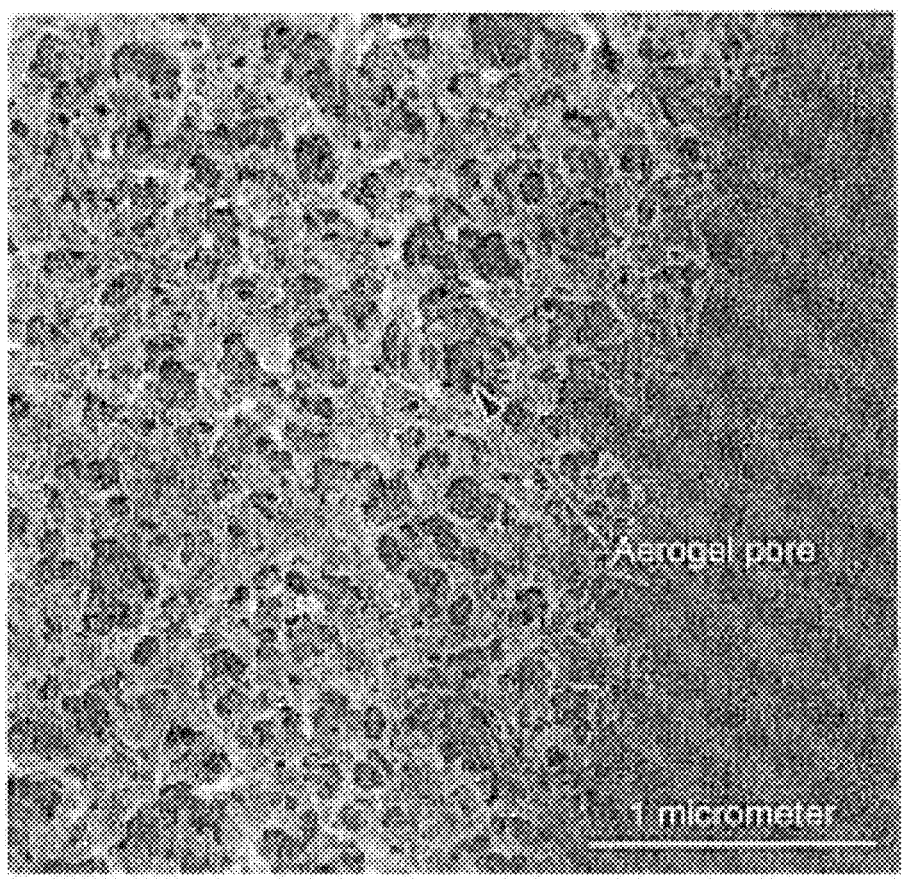
FIG. 11 is a scanning electron microscope view of a section of aerogel showing pores in the aerogel.

FIG. 11 illustrates one embodiment of a scanning electron microscope view of a section of aerogel showing pores in the aerogel. The present disclosure may utilize aerogel nanotechnology for dramatic enhancements in the active surface area of the adsorptive media. Aerogel nanotechnology, including, but not limited to, the advanced aerogel technology developed by the Lawrence Livermore National Laboratory (LLNL), may be used in one or more embodiments of this invention. For example, carbon based aerogels may be made with surface areas ranging from 600 to 3125 square meters per grain. Compare with the best activated carbons made from coconut hulls and similar materials, which have specific surface areas of 100 to 1500 square meters per grain. Since sorption capacity is proportional to specific surface area, with the adsorption of approximately 1014 molecules per square meter in some cases, the higher surface area attainable with carbon aerogels may reduce the required mass of the adsorption bed, thereby leading to a refrigeration or air conditioning system of lower weight and smaller size. In addition to the use of carbon aerogels, other types of aerogels may be used including, but not limited to, a wide variety of aerogels made of silica and metal oxides, etc. and other aerogels as would be understood by one having ordinary skill in the art upon reading the present disclosure.

Figure 12A:
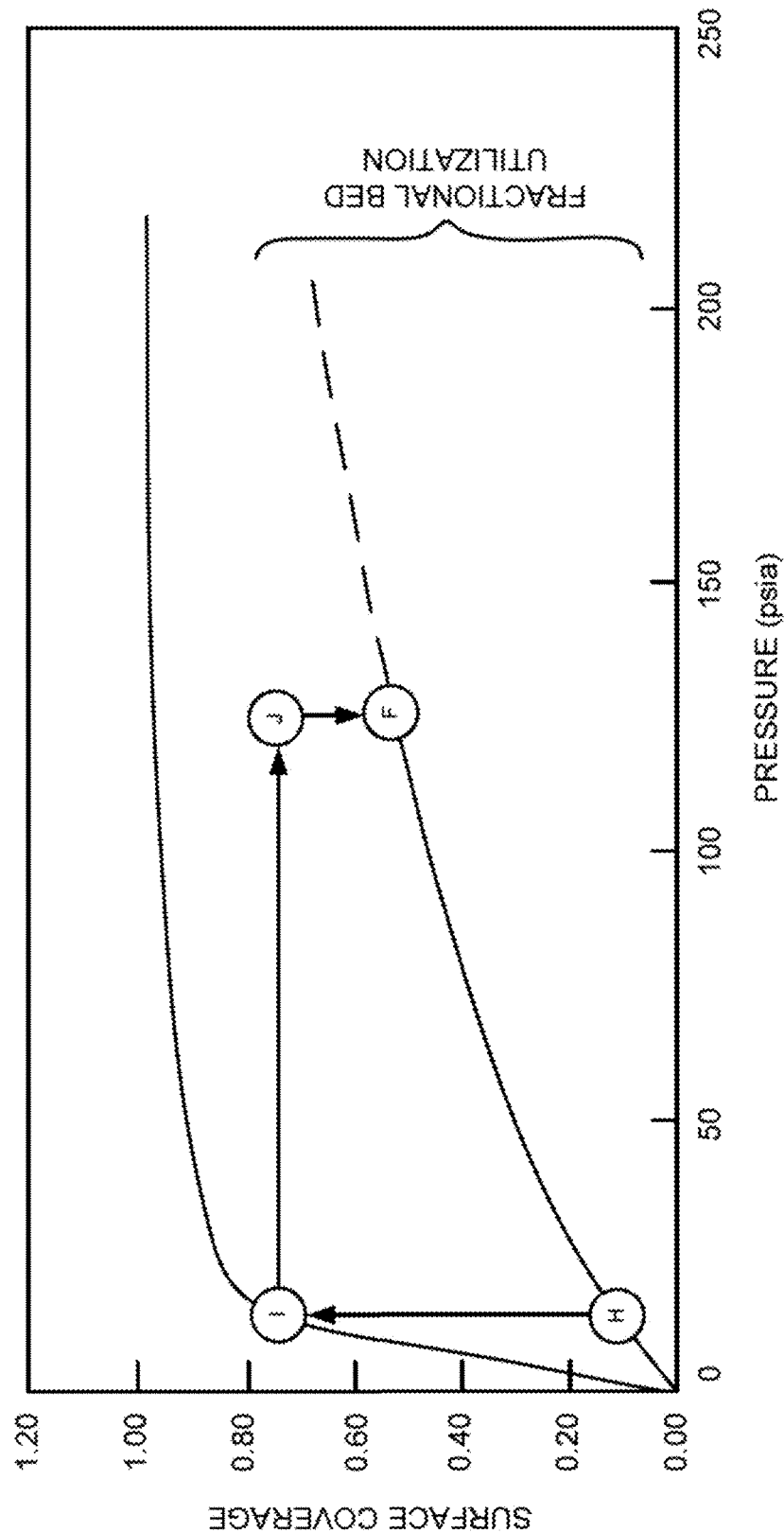
FIG. 12A illustrates the predicted Langmuir adsorption isotherm for a better refrigerant and adsorption-medium combination at various temperature levels.

FIG. 12A illustrates one embodiment of the predicted Langmuir adsorption isotherm for a better refrigerant and adsorption-medium combination at various temperature levels. These predictions were based upon the free energy of adsorption and pre-exponential for calculation of the Langmuir parameter summarized below. In one approach, a possible refrigeration cycle is shown as an overlay on the isotherm. The legend gives predictions for various temperature levels (° F.) according to such an approach.

As shown in FIG. 12A, temperature changes induced by thermal heating may be sufficient to cause enough change in surface coverage and gas-phase pressure to drive a practical refrigeration cycle. For a carbon aerogel with a demonstrated active surface area of 3,125 square meters per gram, and assuming a monolayer coverage of iso-butane, a mass loading of approximately 0.6 grams of isobutene per gram of aerogel may be estimated. By using materials with even higher surface areas, loadings of 1 gram per gram or better may be possible in some embodiments.

In another embodiment, the fractional coverage of active sites on the surface of the aerogel by adsorbed refrigerant may then be calculated from the Langmuir parameter and the gas-phase chemical activity of the species being adsorbed. The chemical activity is proportional to gas-phase above the surface where adsorption is occurring. Langmuir adsorption isotherms have been predicted for various compounds, including iso-butane on zeolites, as a function of pressure and temperature. In the case of iso-butane adsorbed on zeolite, predictions were based upon Langmuir parameters determined from the regression analysis of published data.

In one embodiment, where isobutene may be adsorbed on zeolite, temperature changes induced by thermal energy may be insufficient to cause enough change in surface coverage and gas-phase pressure to drive a practical refrigeration cycle. Similar predictions have been made with optimized combinations of refrigerant and adsorption media (optimum specified in terms of predicted Langmuir parameter). Temperature changes induced by thermal heating may be sufficient to cause enough change in surface coverage and gas-phase pressure to drive a practical refrigeration cycle in some approaches.

Adsorption of refrigerant on the surface of the aerogel (or other adsorption media) may obey the Langmuir adsorption isotherm. The Langmuir parameter for species $K_i$ is defined by the Gibbs free energy of adsorption, the universal gas constant, and the absolute temperature:

$$K_i = \exp\left(\frac{-\Delta G_i}{RT}\right) \qquad \text{Equation 1}$$

In one embodiment, the fractional coverage of active sites on the surface of the aerogel by adsorbed refrigerant may then be calculated from the Langmuir parameter and the gas-phase chemical activity of the species being adsorbed (a). The chemical activity (a) is proportional to gas-phase above the surface where adsorption is occurring.

$$\frac{\theta}{1-\theta} = a\exp\left(\frac{-\Delta G_{ADS}}{RT}\right) \qquad \text{Equation 2}$$

$$\theta = \frac{a\exp\left(\frac{-\Delta G_{ADS}}{RT}\right)}{a\exp\left(\frac{-\Delta G_{ADS}}{RT}\right)+1}$$

In other embodiments involving multi-component refrigerants, refrigerants may compete for available active sites, in accordance with the following modified adsorption isotherm.

$$\theta_i = \frac{K_i a_i}{1 + K_i a_i + K_l a_l} \qquad \text{Equation 3}$$

Figure 12B:
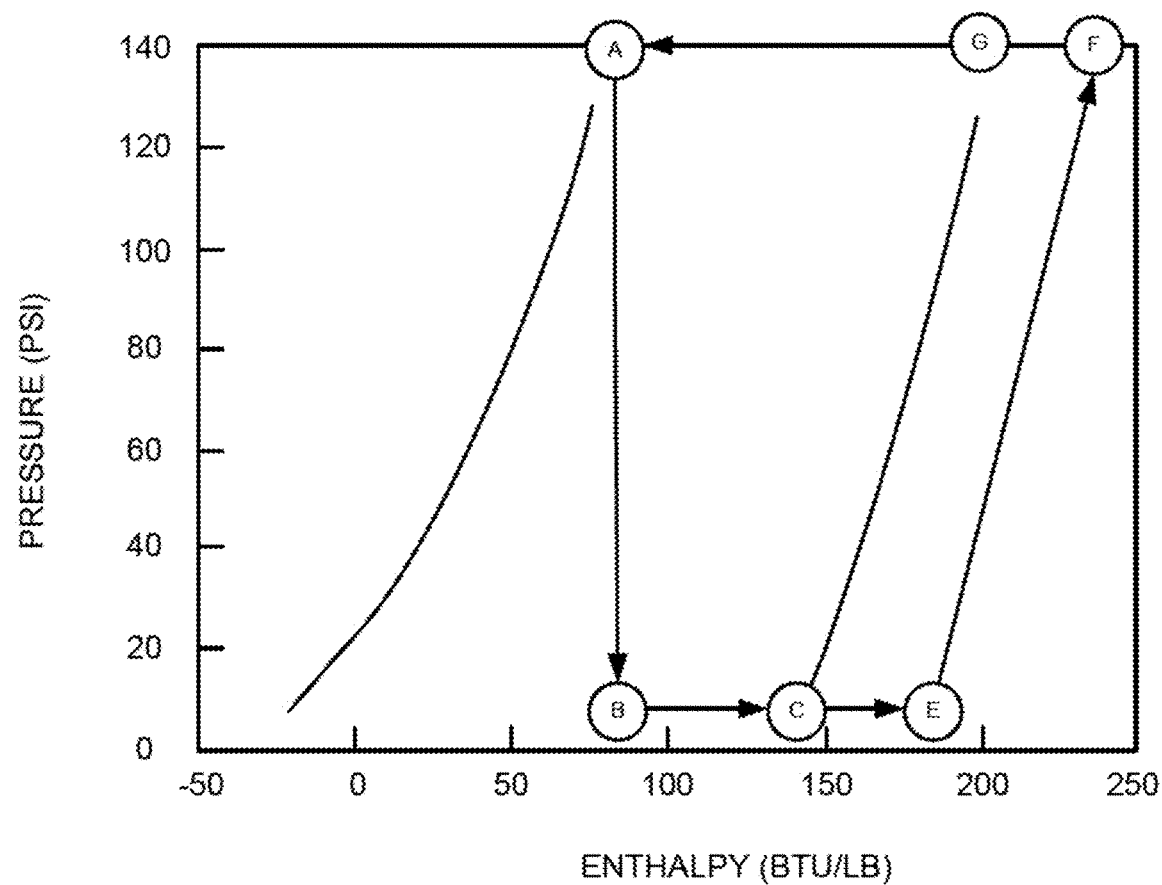
FIG. 12B illustrates a refrigeration cycle.

FIG. 12B illustrates one embodiment of a possible refrigeration cycle. The path from F to A may represent condenser operation between 175° F. and 140° F., removing superheat and the latent heat of vaporization from the refrigerant in one approach. In another embodiment, the path from A to B may represent the expansion of refrigerant, with partial condensation in the evaporator, which is assumed in this example to be operating at 10° F. Moreover, the adsorption bed may operate along the path between points E and F in yet another approach. These are calculations that may not account for the transient nature of the system in some embodiments.

Figure 13:
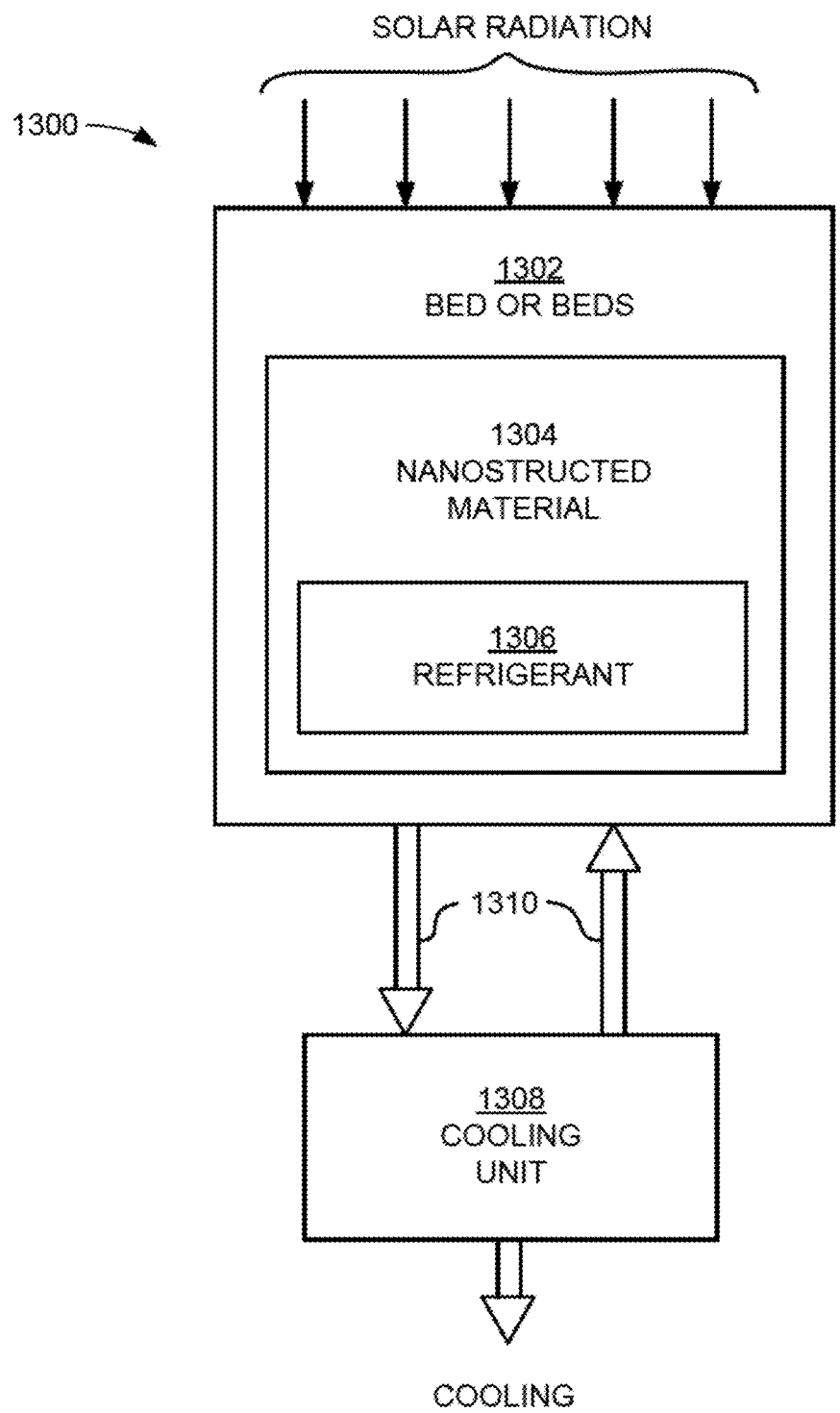
FIG. 13 illustrates another embodiment of a solar powered adsorption-desorption refrigeration system (ADRS) constructed in accordance with the present disclosure.

FIG. 13 illustrates another embodiment of a thermally controlled adsorption-desorption refrigeration system (ADRS) constructed in accordance with the present disclosure. As shown in FIG. 13, the thermally controlled adsorption-desorption refrigeration system may be designated generally by the reference numeral 1300. Reference numerals are used to designate various components, systems, units, and devices, which are generally identified as "item(s)" in FIGS. 7-14.

In one embodiment, item 1402 may be a bed(s) of high specific surface area adsorption media, including, but not limited to, a nanostructural foam, an aerogel based media 1404, etc. or other high specific surface area adsorption media as would be understood by one having ordinary skill in the art. The bed(s) 1402 may be of high specific surface area adsorption media 1404 in one approach. Item 1404 may be any nanostructural material including, but not limited to, an aerogel, a sol gel, a zeolite, etc. or any other nanostructural material as would be understood by one having ordinary skill in the art. Item 1406 may be a refrigerant.

Additionally, in one embodiment, item 1408 may be a cooling unit. Item 1408 may include a two-stage condenser and an expansion valve in one approach. Further, in one embodiment, item 1410 may be a circulation system for circulating the refrigerant from the bed or beds of adsorption media to the cooling unit to provide cooling from energy from the sun and to return the refrigerant from the cooling unit to the bed or beds of adsorption media.

The U.S. Department of Energy (DOE) estimates the total primary energy consumption for commercial buildings was 10.72 quadrillion BTU (quads) in 1983, compared with 14.74 quads for the residential sector. According to the DOE Building Technologies Program, 40-60% of the energy used in U.S. commercial (and residential) buildings is for HVAC, creating massive potential for energy savings with a system that could cut cooling energy use by at least 30-60%. Initial vertical segments in the commercial building market may include, but are not limited to, government and commercial office buildings; government facilities such as prisons, military bases, and schools; hotels and resorts; fanning, wineries and other rural facilities; general light industrial offices, printers and clothing makers, etc.

The present disclosure relates to a thermally controlled aerogel-based adsorption cooling system. In one embodiment of this cooling system, thermal energy may be focused by thermal collectors onto on bed, which may contain an ultra high surface area aerogel. Heating may cause thermal desorption of a refrigerant previously adsorbed into the aerogel's pores. In another approach, refrigerant desorption may increase the gas-phase pressure in the pores, and may thereby force the gaseous refrigerant to flow out of the irradiated bed and through a two-stage condenser. In the condenser, heat may be first removed from the hot gaseous refrigerant by a stream of water that eventually flows into a hot water heater and storage system. The refrigerant may then be further cooled by chilled refrigerant leaving the evaporator after vaporization.

After passing through the two-stage condenser, the gaseous refrigerant may undergo expansion through an expansion valve in one embodiment. A portion of the refrigerant may condense in the evaporator, while some of the refrigerant may be flashed and may exit the evaporator. The evaporator may absorb heat from the area being cooled, which may result in further vaporization of the refrigerant. In another approach, the cool, vaporized refrigerant may leaves the evaporator and may pass through tubes in the shell-and-tube heat exchanger comprising the second stage of the two-stage condenser. After leaving the tube side of this heat exchanger, the cool, vaporized refrigerant may flow back to the bed of aerogel.

In one embodiment, most of the refrigerant may adsorb on the bed during the first cycle. When the refrigeration cycle is reversed, the refrigerant may thermally desorb from the bed in some approaches. As the cycling rate increases, the quantity of adsorption media, the system size, and the associated cost may become smaller.

As disclosed herein, some examples of the underlying features and advantages of the present disclosure may include, but are not limited to: (1) thermally controlled thermal desorption of a refrigerant from a suitable high-surface area media may be used instead of mechanical compressors as the basis of an efficient refrigeration cycle, thereby reducing the need for electrical power from grids for cooling homes and offices; (2) sorption capacity is proportional to specific surface area, with the adsorption of approximately 1014 molecules per square meter in some embodiments; (2) the higher surface area attainable with carbon aerogels may reduce the required mass of the adsorption bed, thereby enabling the construction of an adsorption-type air conditioning system of lower weight and smaller size relative to those relying on commercially available sorbent materials; (3) carbon aerogel may be fabricated as monolithic flat sheets for optimal heat and mass transfer in the adsorption bed; (4) carbon aerogels may be readily modified to tune the thermodynamics of adsorption, providing flexibility in the selection of refrigerants-including non—CFCs—and in operating temperatures; (5) injection-molded silica aerogel has the highest heat transfer resistance of any known engineered material and may be used to control heat leakage in the system, thereby increasing overall efficiency; (6) by eliminating moving parts, longer service life, lower maintenance costs and lower levels of noise may be achieved, etc. as would be understood by one having ordinary skill in the art upon reading the present disclosure.

Aerogels are among the most versatile materials available owing to their wide variety of exceptional properties. For example, aerogels are known to exhibit the lowest thermal conductivities (0.017-0.021 W/m·K), sound velocities (<500 m/s), and refractive indexes (1.001-1.15) of any bulk solid material. Most of the properties of bulk aerogels may also be exhibited in other forms of the material, including, but not limited to thin sheets, films, etc. or other material as would be understood by understood by one having ordinary skill in the art upon reading the present disclosure, which may be important for integration of these materials into devices. As a result, aerogels have been developed for a variety of applications, including, but not limited to, catalysis, sensing, thermal insulation, waste management, molds for molten metals, optics, capacitors, energetic composites, imaging devices, cosmic dust collection, high-energy-density physics applications, etc.

LLNL is recognized as a world leader in aerogel research, holding several patents in the technology dating back to the mid-1990s. Organic and carbon aerogels were both invented at LLNL, and much of the technology resulting from that research has been licensed for various technologies, including capacitors and desalination. The process used to synthesize high-surface-area carbon aerogel adsorbents was also developed at the Laboratory, where the materials are currently used as adsorbents for hydrogen in low-pressure storage tanks. In addition, the rapid supercritical extraction (RSCE) process that may be used to fabricate the insulating aerogel parts in accordance to one embodiment was developed and patented by LLNL. The RSCE process—similar to injection molding, a common process used to manufacture some plastics—may offer a number of advantages over conventional supercritical drying, including simpler and less costly hardware, monolithic gels that do not have to be pre-formed, and an overall much faster process—the entire process for making monolithic parts may be accomplished in just a few hours instead of the several days required by conventional supercritical drying. The RSCE process may be extremely valuable in the fabrication of conformable monolithic for the proposed cooling system's insulation in some approaches.

Many conventional solar concentrators rely on parabolic mirrors to heat pipes located at the focal points of the mirrors. In the case of adsorptive refrigeration and cooling systems, this may dictate that the adsorption media be placed in a cylindrical envelope for the most efficient heating. Alternatively, large inexpensive Fresnel optics, now available, may be used for solar collection from the solar-side of planar panels, providing designers with some engineering advantage. In one embodiment, commercially available molded acrylic lenses or reflective concentrators may be used.

Carbon aerogel (CA) is a unique porous solid with network structures consisting of interconnected carbon particles and, as a result, these materials exhibit many interesting properties, such as high surface-to-volume ratios, continuous porosities and high electrical conductivity. Lawrence Livermore National Laboratory has developed a synthetic approach to fabricate CAs with BET surface areas of over 3,000 $m^2$/g. These surface area values are comparable to those of the highest surface area activated carbons. In one embodiment, the synthetic strategy may involve the thermal activation of a CA material with structural features (particles and pores) on the micrometer scale. This approach may not only provide access to high surface areas in CA materials but may also afford monolithic materials with bimodal porosity (macro- and micropores).

An important criterion for effective physisorption is a high surface area that exposes a large number of sorption sites to ad-atom or ad-molecule interaction. Moreover, these sites need to have potential wells that are sufficiently deeper than kT if physisorbents are to operate at reasonable engineering temperatures. Porous carbon materials are promising candidates for the physisorption of refrigerant gases due their lightweight frameworks and high accessible surface areas. High surface area carbons have been studied extensively for low pressure storage of transportation fuels, such as hydrogen and methane. In one embodiment, appreciable amounts of methane may be adsorbed on conventional high surface area activated carbons at 298 K and 3.5 MPa. More specifically, the loading of $CH_4$ on such activated carbons may be approximately 17 weight percent or 0.17 grams of methane per gram of solid carbon.

Carbon aerogels (CAs) are a unique class of porous carbons that possess ultrafine cell sizes, continuous porosities and low mass densities. These properties arise from the aerogel microstructure, a three-dimensional network of interconnected primary carbon particles with diameters that can range from a few nanometers to several microns. In one embodiment, mechanically robust CA monoliths may be synthetically fabricated with BET surface areas in excess of 3,000 $m^2$/g of carbon aerogel, substantially greater than that achievable with the best activated carbons. These surface area values are the highest reported for CAs and exceed the accessible surface area in most commercially available activated carbons.

In addition to extremely large specific surface areas, CAs exhibit a number of other desirable qualities for the adsorption of refrigerant gases. For example, the porosity in these CAs is bimodal, consisting of a large population of micropores (0.7 to 1.2 nanometers in diameter) connected by a continuous macroporous network. Hierarchically porous carbons of this type are superior to carbons with unimodal porosity (i.e. activated carbons) in terms of diffusion efficiency and surface area. In one embodiment, the surface chemistry of the CA may be readily modified to tune the interaction (binding energy) between the refrigerant gas and the adsorbent. This aspect may be particularly important for controlling desorption of refrigerant from the CA during thermal heating.

CAs do not require the specialized drying processes including, but not limited to supercritical extraction, that are typically employed in the synthesis of other aerogel materials, minimizing both the fabrication time and cost associated with these materials. In yet another embodiment, the CAs may be fabricated in a variety of forms, including, but not limited to, conformable monoliths, a feature that may be advantageous for this application. The flexibility associated with the design of these materials may not only facilitate the optimization of adsorbate-adsorbent interactions, but also maximize the gravimetric and volumetric capacities of these CA materials in some approaches.

In one embodiment, the system may use a two-stage condenser to cool and condense the desorbed refrigerant. The first stage may use an external water stream, resulting in a hot water stream for other uses. The second stage may be chilled by the return line of evaporated and expanded refrigerant.

In one embodiment, the evaporator may be a two-phase boiler with both liquid and gaseous refrigerant. Liquid may continuously evaporate as heat is absorbed from the building primary heat exchanger. Additionally, in some approaches, the primary heat exchanger may be of any conventional design, which will allow easy retrofit of the proposed system into new or existing construction.

Silica aerogels are a special class of open-cell foams derived from highly cross-linked gels that are dried using special techniques (supercritical extraction) to preserve the tenuous solid network. These materials have ultrafine cell and pore sizes (<1,000 Å), continuous porosity, high surface area density, and a microstructure composed of interconnected colloidal-like particles or polymeric chains with characteristic diameters of 100 Å. This microstructure is responsible for the unusual optical, acoustical, thermal, and mechanical properties of silica aerogels. In fact, silica aerogels have the lowest thermal conductivity (0.017-0.021 W/m·K) of any solid material and, as a result, have been commercially developed for thermal insulation applications. In one embodiment, silica aerogels may be used as insulators for the proposed AC system. The rapid supercritical extraction process used to fabricate these materials is scalable and may be used for high-throughput production of insulating parts in some approaches.

In one embodiment, the components as disclosed herein may be designed to be compatible with existing building ventilation systems.

Figure 14:
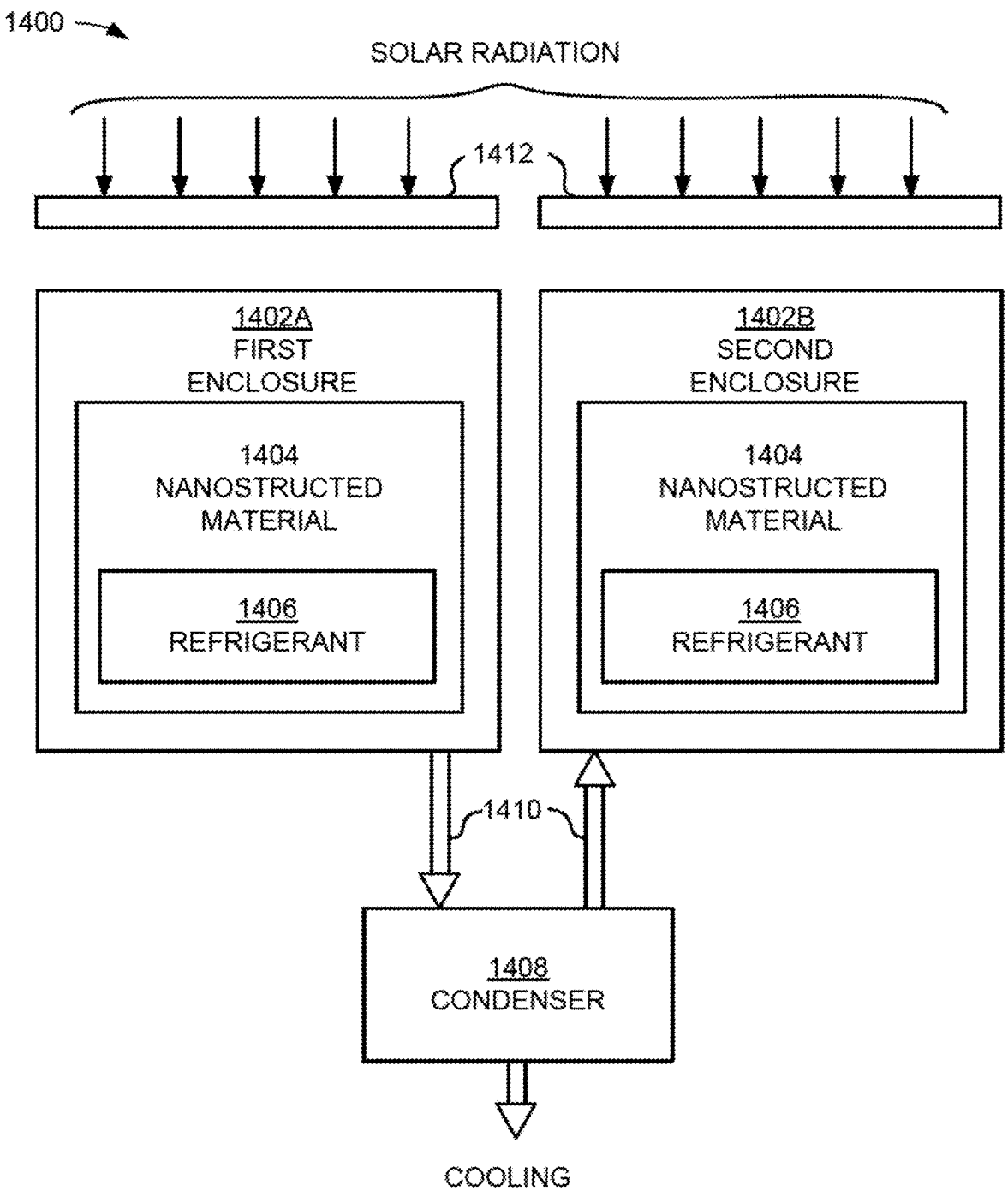
FIG. 14 illustrates yet another embodiment of a solar powered adsorption-desorption refrigeration system (ADRS) constructed in accordance with the present disclosure.

FIG. 14 illustrates one embodiment of a thermally controlled adsorption-desorption refrigeration system (ADRS) constructed in accordance with the present disclosure. As shown in FIG. 14, the thermally controlled adsorption-desorption refrigeration system may be designated generally by the reference numeral 1400. Reference numerals may be used to designate various components, systems, units, and devices, which are generally identified as "item(s)" in FIGS. 7-14.

In one embodiment, item 1402A may be a first bed of high specific surface area adsorption media, including, but not limited to, nanostructural foam, aerogel based media, etc. or other high specific surface area adsorption media as would be understood by one having ordinary skill in the art upon reading the present disclosure. In another embodiment, item 4 may be a second bed with the same properties of the first bed item 1402A. In yet another embodiment, item 1402B may be a retractable sun shade that may be moved to cover or uncover either beds 1402A or 4 or may be positioned to uncover both beds 1402A and 4 at the same time. Moreover, in another embodiment, the beds of high specific surface area adsorption media, item 1402A and item 1402B, may be any nanostructural material including, but not limited to, an aerogel, a sol gel, a zeolite, etc. or any other nanostructural material as would be understood by one having ordinary skill in the art.

In one embodiment, item 1412 may be any blocking system adapted to selectively block thermal energy including, but not limited to, a louvered shade, a shutter shade, an electronic blocking system for blocking energy from the sun, etc. or any other system for blocking thermal energy as would be understood by one having ordinary skill in the art.

As shown in FIG. 14, refrigerant desorption may increase the gas phase pressure in the pores of the adsorption media, thereby forcing the gaseous refrigerant (CR) to flow-out of the first bed 1402A in one approach. In another approach, the GS may flow to the condenser 1408. After passing through the two-stage condenser, the GS may undergo isenthalpic expansion in the expansion valve in yet another embodiment. Additionally, in another embodiment, a portion of the GS may condense in the evaporator while some of the GS may be flashed (chilled refrigerant) and exit the evaporator. The evaporator may absorb heat from the room or area being cooled, which may result in further vaporization of the GS.

Additionally, in one embodiment, the chilled valorized GS may exit the evaporator and, through a line, may enter the condenser second stage and proceed through the tubes of a shell-and-tube heat exchanger which comprises the condenser second stage of the two-stage condenser. In another approach, the GS may then leave the condenser by way of a line and pass through a valve and deposited in the-adsorption media of bed 1402B, which is at a lower temperature than the first bed 1402A.

In other approaches, an adsorptive cooling system may take alternative embodiments. For example, in one embodiment an adsorptive cooling system includes a first highly adsorptive structure positioned to receive thermal energy from a thermal energy source and a second highly adsorptive structure positioned to receive thermal energy from the thermal energy source (such as bed 1402A and/or 1402B of FIG. 14).

In more approaches, the adsorptive cooling system may further include a second highly adsorptive structure comprising a second substrate; a second carbon aerogel adhered to the second substrate, where the second carbon aerogel is characterized by having physical characteristics of in-situ formation on the second substrate, a cooling unit; and a circulation system adapted for circulating a refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure.

In still more approaches, an adsorptive cooling system includes a first highly adsorptive structure positioned to receive thermal energy from a thermal energy source. Moreover, as described above the first highly adsorptive structure may include a first substrate and a first carbon aerogel adhered to the first substrate. Similarly, in some approaches a second highly adsorptive structure positioned to receive thermal energy from the thermal energy source includes a second substrate; a second carbon aerogel adhered to the second substrate, a cooling unit; and a circulation system adapted for circulating the refrigerant from at least one of the first highly adsorptive structure and the second highly adsorptive structure to the cooling unit to provide cooling from the thermal energy source and to return the refrigerant from the cooling unit to at least one of the first highly adsorptive structure and the second highly adsorptive structure, where the first and second carbon aerogels are each characterized by having physical characteristics of in-situ formation on the respective substrates.

In some approaches, the first and/or second substrate may include a plurality of microchannels, where each of the first carbon aerogel and the second carbon aerogel are adhered to an interior and/or exterior surface of the plurality of microchannels. Moreover, the microchannels may be defined by grooves in a surface of the substrate nearest the carbon aerogel, surfaces of a plurality of microcapillaries arranged along a surface of the substrate nearest the carbon aerogel, ridges in a surface of the substrate nearest the carbon aerogel, etc. as would be understood by one having ordinary skill in the art upon reading the present descriptions.

Of course, the plurality of microchannels may permit adherence of the carbon aerogel in any location as would be understood by one having ordinary skill in the art upon reading the present descriptions. In particular, in several approaches the carbon aerogel may be adhered to one or more of the interior surface of a microcapillary, the exterior surface of a microcapillary, the exterior surface of a ridge and/or valley of a plurality of microchannels, any combination thereof, and etc. as would be understood by one having ordinary skill in the art upon reading the present descriptions.

Moreover still, in preferred embodiments the microchannels provide improved ingress and egress to and from the carbon aerogel for a binding agent such as a refrigerant, especially relative to a traditional cylindrical canister disposition for a highly adsorptive structure such as a carbon aerogel. Notably, as understood herein grooves may include in inner and/or outer surfaces of the substrate.

Several exemplary embodiment of a substrate having a plurality of microchannels is depicted in FIGS. 15A-15C, with several corresponding microchannel arrangements shown in FIGS. 16A-16D. In particular, as shown in FIG. 15A, an adsorptive cooling system may include a one or more substrates 1502 such as corrugated substrate 1502. Moreover, such corrugated substrates may be arranged as shown in FIG. 15A to form intermittent diamond-like structures to maximize surface area of an overall absorptive structure. Furthermore, the corrugated substrate may be further defined by a plurality of peaks 1506 and valleys 1504, in some approaches.

Moreover, as shown particularly in FIGS. 15B and 15C, the substrate may further include a plurality of microchannels such as shown in zoomed region 1508. In particular, in some embodiments the substrate 1502 may include a plurality of microcapillaries 1510 as shown substantially in FIG. 15B. Additionally and/or alternatively the substrate 1502 may include a plurality of grooves such as shown in FIG. 15C, such grooves being defined by a plurality of peaks 1514 and valleys 1512, in some approaches. Of course, as would be understood by one having ordinary skill in the art upon reading the present descriptions, other arrangements of microchannels may be employed, including nominal variations to the structural arrangements shown in FIGS. 15B-15C, in various approaches.

Moreover still, the microchannels may be arranged according to any suitable configuration such as shown in FIGS. 16A-16D, in some approaches. Particularly, the microchannels may be arranged in a concentric patterns of channels such as to substantially form parallel channels in the shape of a U, as shown in FIG. 16A, a straight line as shown in FIG. 16B, an "s" curve as shown in FIG. 16C, and a zig-zag pattern as shown in FIG. 16D, in various embodiments. Of course, as would be understood by one having ordinary skill in the art upon reading the present descriptions, any suitable arrangement may be employed and those arrangements depicted in FIGS. 16A-16D are made merely for illustrative purposes.

In particularly preferred approaches, an adsorptive cooling system as disclosed herein further characterized by a 7 kilowatt (kW) cooling capacity and/or an electrical to cooling energy coefficient of performance (COP) greater than 3.8.

Different embodiments of Applicant's invention may include or incorporate one or more of the following features:

Solar driven adsorption-based refrigeration cycle—This invention directly converts solar heat to the work of compression necessary to drive the adsorption-based refrigeration system. The outer surface of the pressure envelope surrounding the adsorption bed would be coated to maximize the absorption of solar radiation. Solar concentration may also be used, exploiting concave mirrors and large-format Fresnel lenses.

High surface area aerogel adsorption beds—This invention exploit's LLNL's aerogel nanotechnology for dramatic enhancements in the active surface area of the adsorptive media. LLNL's advanced aerogel technology will be used in one embodiment of this invention. For example, carbon based aerogels can be made with surface areas ranging from 600 to 3125 square meters per gram. In contrast, the best activated carbons, made from coconut hulls and similar materials, have specific surface areas of 100 to 1500 square meters per gram. Since sorption capacity is proportional to specific surface area, with the adsorption of approximately 1014 molecules per square meter in some cases, the higher surface area attainable with carbon aerogels can reduce the required mass of the adsorption bed, thereby leading to a refrigeration or air conditioning system of lower weight and smaller size. In addition to the use of carbon aerogels, other types of aerogels can also be used, including a wide variety of aerogels made of silica and metal oxides.

Adsorption bed in form of monolithic sheets—Sheets of monolithic carbon aerogels provide not only ultra high surface area, but also the ability to construct flat sheets with optimal heat and mass transfer characteristics. These monolithic sheets of aerogel can be bonded to the inner surfaces of the pressure envelope surrounding the adsorption bed.

Ability to use non-CFC refrigerants—It is now widely accepted that CFC, HFC, and HCFC refrigerants, as well as other halogenated molecules, pose a serious threat to the Earth's ozone layer. The use of non-halogenated refrigerants is therefore desirable from an environmental perspective. This invention is capable of using a wide variety of both halogenated, as well as more environmentally benign non-halogenated refrigerants.

Exceptional thermal insulation—In one embodiment, the invention uses injection-molded silica aerogel for thermal insulation. This insulation has the highest heat transfer resistance of any known engineering material, and will therefore help control heat leakage in the refrigeration and air conditioning system, therefore increasing the overall efficiency of the system.

No moving parts—The invention relies on the solid adsorption bed for compression, and has no moving parts, Therefore; the service life of refrigeration and air conditioning cycles based upon this technology are expected to have unlimited service life, and virtually eliminate wear out associated with moving parts. No lubricants are required. The elimination of moving parts will dramatically reduce the noise from the cooling system, which will be especially desirable in urban settings.

Hermetically sealed system—By eliminating the need for moving parts and electrical feed-through, a hermetically sealed pressure envelope that contains the refrigerant can be used. This will minimize the probability of refrigerant leakage from the system, and will therefore eliminate the need for periodic charging of the system with makeup refrigerant.

Enhanced solar collection—The world's largest Fresnel optics, originally developed for the National Ignition Facility, can be used to enhance solar concentration and increase the upper operating temperature of the adsorption bed during thermal desorption, thereby achieving higher compression and greater efficiency. Depending upon the convention used, this feature will increase the COP (coefficient of performance), the SEER (seasonal energy efficiency rating), or the EER (energy efficiency rating) of the system.

Flexible heating options—Sufficient flexibility to use fossil fuel or electricity for auxiliary heating. This system can also be operated from other heat sources, including waste heat from automotive engines, industrial plants, and nuclear power plants. This novel refrigeration system is therefore suitable for high latitude, cold climates and cloudy days.

Integration with hot water heater—The system will have an integrated hot water heater or heaters.

Benefits

Applicant's invention benefits including the following:

Compared to traditional cooling systems, this technology has several advantages. For example, a carbon-based actuator material is light-weight, inexpensive and environmentally friendly (e.g., lead is not a required material). Also, the technology is scalable, that is, large monolithic actuators can be envisioned, e.g., greater than about 1 mm$^3$, greater than about 1 cm$^3$, greater than about 10 cm$^3$, etc. Moreover, such larger structures may be formed of one contiguously-formed structure or several smaller structures coupled together. Moreover still, the material can be formed or machined in many different shapes, as depicted in FIG. 5.

Further advantages include the technology is safe: a low-voltage driving signal may be used in some embodiments. Further, the material in some embodiments is thermally stable up to at least 1000 degrees C. (in an inert atmosphere), and potentially up to about 1500 degrees C. and thus may allow for high temperature applications depending on the thermal stability of the electrolyte. In addition, the material in some embodiments is equally well-suited for hydrogen storage, supercapacitor and electro-catalysis applications (fuel cells).

1. Solar powered with flexibility for alternative heating options
2. Ultra-high surface area adsorption media, with substantially higher refrigerant adsorption capacity per mass of adsorption bed, reducing size and making installation easier
3. No moving parts, extreme reliability, and silent operation
4. Hermetically sealed refrigeration loops, preventing leakage, eliminating need for lubricants and recharging, and enabling recycling of refrigerant
5. Monolithic sheets of adsorption media for superior heat and mass transfer
6. World's best-known insulation better control of heat flow and improved system efficiency
7. Higher thermal desorption temperature and compression for better efficiency
8. Integration of other household appliances, such as hot water heater.

Additional details which may be incorporated into various embodiments of the present invention are described and illustrated in U.S. Provisional Patent Application No. 61/256,243 entitled "Solar-Powered Adsorptive Refrigeration Cycle with Nanostructural Foam & Aerogel Based Media" filed Oct. 29, 2009 by Farmer, which is hereby incorporated in its entirety by reference for all purposes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A product, comprising:
   a highly adsorptive structure comprising:
   a substrate; and
   a carbon aerogel adhered to the substrate,
   wherein the carbon aerogel is characterized by having physical characteristics of in situ formation on the substrate,
   wherein the carbon aerogel is further characterized by a surface area of greater than 3000 m$^2$/g;
   wherein the substrate comprises a plurality of microchannels; and
   wherein the physical characteristics of in situ formation on the substrate comprise the carbon aerogel being adhered to interior and exterior surfaces of the plurality of microchannels.

2. The highly adsorptive structure as recited in claim 1, wherein the physical characteristics of in situ formation on the substrate comprise the carbon aerogel having an exterior surface substantially conformal to the substrate positioned adjacent thereto.

3. The highly adsorptive structure as recited in claim 2, wherein the in situ formation comprises a casting process, and wherein the physical characteristics of in situ formation on the substrate comprise a volumetric reduction of the carbon aerogel.

4. The highly adsorptive structure as recited in claim 1, wherein the carbon aerogel comprises a monolithic structure having a surface facing the substrate that is substantially conformal to the surface of the substrate adjacent thereto.

5. The highly adsorptive structure as recited in claim 1, wherein the microchannels are defined by grooves in a surface of the substrate nearest the carbon aerogel, wherein the surface of the substrate having the grooves is corrugated, and wherein the grooves provide ingress and egress paths for a refrigerant.

6. The highly adsorptive structure as recited in claim 1, wherein surfaces of the highly adsorptive structure have deposited thereon one or more conformal films, each conformal film independently comprising of one or more materials selected from a group consisting of: W, Ru, Pt, Cu, TiO$_2$, and ZnO.

7. The highly adsorptive structure as recited in claim 1, wherein surfaces of the highly adsorptive structure have deposited thereon nanoparticles of one or more materials selected from a group consisting of: TiO$_2$, and ZnO.

8. The highly adsorptive structure as recited in claim 1, wherein the microchannels are defined by inner and outer surfaces of a plurality of microcapillaries of the substrate; and
   wherein the microcapillaries provide ingress and egress paths for a refrigerant.

9. The highly adsorptive structure as recited in claim 1, wherein the carbon aerogel is biased toward the substrate for increasing a thermal conductivity between the carbon aerogel and the substrate.

10. The highly adsorptive structure as recited in claim 1, further comprising a refrigerant adsorbed to the carbon aerogel, wherein the refrigerant desorbs from the carbon aerogel at a temperature of less than 90° C.

11. The product as recited in claim 1, further comprising:
   a container enclosing the highly adsorptive structure, the container having an opening configured for ingress and egress of a refrigerant; and
   a circulation system configured to circulate the refrigerant to and from the highly adsorptive structure.

12. An adsorptive cooling system comprising:
   a first highly adsorptive structure positioned to receive thermal energy from a thermal energy source, the first highly adsorptive structure comprising:
      a first substrate; and
      a first carbon aerogel adhered to the first substrate,
   a second highly adsorptive structure positioned to receive thermal energy from the thermal energy source, the second highly adsorptive structure comprising:
      a second substrate; and
      a second carbon aerogel adhered to the second substrate,
   a blocking system configured to selectively block the first highly adsorptive structure and/or the second highly adsorptive structure from receiving thermal energy from the thermal energy source;
   a cooling unit; and
   a circulation system configured to circulate a refrigerant from the first highly adsorptive structure and/or the second highly adsorptive structure to the cooling unit to provide cooling from the thermal energy source and to return the refrigerant from the cooling unit to the first highly adsorptive structure and/or the second highly adsorptive structure,
   wherein the first carbon aerogel is structurally characterized by having a bimodal porosity and physical characteristics of in situ formation on the first substrate,
   wherein the second carbon aerogel is structurally characterized by having a bimodal porosity and physical characteristics of in situ formation on the second substrate, and
   wherein the first substrate comprises a first plurality of microchannels, and the second substrate comprises a second plurality of microchannels,
   wherein the first carbon aerogel is adhered to an interior and/or exterior surface of the first plurality of microchannels and the second carbon aerogel is adhered to an interior and/or exterior surface of the second plurality of microchannels,
   wherein the first plurality of microchannels are defined by: grooves in a surface of the first substrate nearest the first carbon aerogel and/or surfaces of a plurality of microcapillaries of the first substrate,
   wherein the second plurality of microchannels are defined by: grooves in a surface of the second substrate nearest the second carbon aerogel and/or surfaces of a plurality of microcapillaries of the second substrate,
   wherein the first plurality of microchannels and the second plurality of microchannels each independently provide ingress and egress paths for a refrigerant; and
   wherein the first carbon aerogel and the second carbon aerogel are each independently characterized by a surface area of greater than 3000 $m^2/g$.

13. The adsorptive cooling system as recited in claim 12, wherein the thermal energy source is selected from the group consisting of: the sun, a heating element, and waste heat; and
   wherein the blocking system is selected from the group consisting of: a louvered shade, a shutter shade, and an electronic light blocking system.

14. An adsorptive cooling system comprising:
   a first highly adsorptive structure positioned to receive thermal energy from a thermal energy source, the first highly adsorptive structure comprising:
      a first substrate; and
      a first carbon aerogel adhered to the first substrate, the first carbon aerogel comprising a monolithic structure having a bimodal pore distribution and a surface facing the first substrate that is substantially conformal to the surface of the first substrate adjacent thereto,
   a second highly adsorptive structure positioned to receive thermal energy from the thermal energy source, the second highly adsorptive structure comprising:
      a second substrate; and
      a second carbon aerogel adhered to the second substrate, the second carbon aerogel comprising a monolithic structure having a bimodal pore distribution and a surface facing the second substrate that is substantially conformal to the surface of the second substrate adjacent thereto; and
   a cooling unit; and
   a circulation system configured to:
      circulate a refrigerant from the first highly adsorptive structure and/or the second highly adsorptive structure to the cooling unit to provide cooling from the thermal energy source; and
      return the refrigerant from the cooling unit to the first highly adsorptive structure and/or the second highly adsorptive structure;
   wherein the first carbon aerogel and the second carbon aerogel are each characterized by a surface area of greater than 3000 $m^2/g$,
   wherein the adsorptive cooling system is characterized by a 7 kilowatt (kW) cooling capacity,
   wherein the adsorptive cooling system is characterized by an electrical to cooling energy coefficient of performance (COP) greater than 3.8,
   wherein the refrigerant desorbs from each of the first carbon aerogel and the second carbon aerogel at a temperature of less than 90° C.,
   wherein the first substrate comprises a first plurality of microchannels configured to conduct thermal energy through an interior volume of the first plurality of microchannels and along an exterior surface of the first plurality of microchannels,
   wherein the first carbon aerogel is characterized by having physical characteristics of in-situ formation on the first substrate, the physical characteristics of in situ formation comprising:
      the first carbon aerogel being adhered to each of an interior surface of the first plurality of microchannels and an exterior surface of the first plurality of microchannels; and
      a volumetric reduction of the first carbon aerogel, wherein the second substrate comprises a second plurality of microchannels configured to conduct thermal energy through an interior volume of the second plurality of microchannels and along the exterior surface of the second plurality of microchannels, wherein the second carbon aerogel is characterized by having physical characteristics of in situ formation on the second substrate, the physical characteristics of in situ formation comprising:

the second carbon aerogel being adhered to each of an interior surface of the second plurality of microchannels and an exterior surface of the second plurality of microchannels; and a volumetric reduction of the second carbon aerogel, wherein the in situ formation on the first substrate and the in situ formation on the second substrate each comprise a casting process; and wherein the first and second substrates each independently comprise single-walled carbon nanotubes (SWCNT) and/or multi-walled carbon nanotubes (MWCNT).

15. The highly adsorptive structure as recited in claim 1, wherein the substrate comprises carbon nanotubes.

16. The highly adsorptive structure as recited in claim 1, wherein the carbon aerogel comprises a plurality of micropores having an average diameter of greater than about 50 nm, and a plurality of micropores having an average diameter of less than about 2 nm.

17. The highly adsorptive structure as recited in claim 1, wherein the carbon aerogel comprises a network of interconnected primary particles, each primary particle having a diameter ranging from about 3 nm to about 25 nm.

18. The highly adsorptive structure as recited in claim 5, wherein the refrigerant is selected from the group consisting of: methyl silane, dimethyl ether, methyl acetylene, methyl phosphine, bromo difluoro nitroso methane, methyl nitrate, 1,3 butadiene, butane, trans 2-butene, trimethyl amine, cis 2-butene, 1-butene-3-one, methane thiol, fulvene, 1-butyne, butadiyne, and methylallene.

19. The highly adsorptive structure as recited in claim 1, wherein the highly adsorptive structure comprises a bimodal distribution of pores including a plurality of micropores connected by a continuous macroporous network.

20. The highly adsorptive structure as recited in claim 19, wherein the micropores are characterized by a diameter in a range from about 0.7 nanometers to about 1.2 nanometers;

wherein the microchannels are defined by inner or outer surfaces of a plurality of microcapillaries of the substrate;

wherein the microchannels are defined by grooves in a surface of the substrate nearest the carbon aerogel;

wherein the surface of the substrate having the grooves is corrugated;

wherein the grooves provide ingress and egress paths for a refrigerant;

wherein the refrigerant is selected from the group consisting of: methyl silane, propylene, propadiene, cyclopropane, dimethyl ether, methyl acetylene, methyl phosphine, bromo difluoro nitroso methane, methyl nitrate, isobutene, isobutylene, 1-butene, amino methane, 1,3 butadiene, trans 2-butene, trimethyl amine, cis 2-butene, 1-butene-3-one, vinyl acetylene, methane thiol, fulvene, 1-butyne, neopentane, butadiyne, methylallene, cyclobutane, acetaldehyde, and cycloneptane;

wherein the in situ formation comprises a casting process; and wherein the physical characteristics of in situ formation on the substrate comprise:

a volumetric reduction of the carbon aerogel; and the carbon aerogel having an exterior surface substantially conformal to the substrate positioned adjacent thereto.

21. The highly adsorptive structure as recited in claim 19, comprising a blocking system configured to block the highly adsorptive structure from receiving thermal energy from a thermal energy source.

22. The product as recited in claim 1, comprising:

a second highly adsorptive structure, the second highly adsorptive structure comprising:

a second substrate; and a second carbon aerogel adhered to the second substrate, wherein the second carbon aerogel is characterized by having physical characteristics of in situ formation on the second substrate, wherein the second carbon aerogel is characterized by a surface area of greater than 3000 $m^2/g$;

a cooling unit; and and a circulation system configured to circulate a refrigerant from the highly adsorptive structure and/or the second highly adsorptive structure to the cooling unit and to return the refrigerant from the cooling unit to the highly adsorptive structure and/or the second highly adsorptive structure.

23. The product as recited in claim 22, wherein the product has a 7 kilowatt cooling capacity and an electrical to cooling energy coefficient of performance greater than 3.8.

24. The product as recited in claim 1, further comprising a blocking system configured to selectively block thermal energy from a thermal energy source configured to deliver thermal energy to the highly adsorptive structure.

25. The product as recited in claim 24, wherein the thermal energy source is selected from the group consisting of: the sun, a heating element, and waste heat; and wherein the blocking system is a retractable shade.

26. The product as recited in claim 1, wherein the substrate comprises: single-walled carbon nanotubes (SWCNT) and/or multi-walled carbon nanotubes (MWCNT).

27. The system as recited in claim 12, wherein the first substrate and/or the second substrate each independently comprise: single-walled carbon nanotubes (SWCNT) and/or multi-walled carbon nanotubes (MWCNT).

* * * * *